(12) United States Patent
Laor

(10) Patent No.: US 6,606,426 B2
(45) Date of Patent: Aug. 12, 2003

(54) PIEZOELECTRIC AND ELECTROMAGNETIC ACTUATORS FOR BEAM ALIGNMENT AND SYSTEMS AND METHODS USING THE SAME

(75) Inventor: Herzel Laor, 2050 Hillsdale Cir., Boulder, CO (US) 80305

(73) Assignee: Herzel Laor, Boulder, CO (US)

( * ) Notice: Subject to any disclaimer, the term of this patent is extended or adjusted under 35 U.S.C. 154(b) by 0 days.

(21) Appl. No.: 09/983,751

(22) Filed: Oct. 25, 2001

(65) Prior Publication Data

US 2002/0054728 A1 May 9, 2002

Related U.S. Application Data

(60) Provisional application No. 60/245,746, filed on Nov. 3, 2000, provisional application No. 60/245,747, filed on Nov. 3, 2000, provisional application No. 60/266,005, filed on Feb. 2, 2001, and provisional application No. 60/309,881, filed on Aug. 6, 2001.

(51) Int. Cl.[7] .............................. G02B 6/26; G02B 6/42
(52) U.S. Cl. .......................................... 385/16; 385/15
(58) Field of Search .............................. 385/15, 16, 17

(56) References Cited

U.S. PATENT DOCUMENTS

| | | | |
|---|---|---|---|
| 1,160,546 A | 9/1915 | Catravas | |
| 3,349,174 A | 10/1967 | Warschauer | |
| 3,902,084 A | 8/1975 | May, Jr. .................... | 310/8.1 |
| 4,019,073 A | 4/1977 | Vishnevsky et al. ........ | 310/8.2 |
| 4,365,863 A | 12/1982 | Broussaud ................. | 350/96 |
| 4,383,637 A | 5/1983 | Pfieffer et al. ............. | 229/38 |
| 4,422,002 A | 12/1983 | Binnig et al. ............... | 310/328 |
| 4,470,662 A | 9/1984 | Mumzhiu ................. | 350/96.15 |
| 4,727,728 A | 3/1988 | Brown ......................... | 62/244 |
| 4,739,212 A | 4/1988 | Imasaka et al. ............. | 310/323 |
| 4,820,045 A | 4/1989 | Boisde et al. .............. | 356/319 |
| 4,838,631 A | 6/1989 | Chande et al. .............. | 350/6.6 |
| 4,882,500 A | 11/1989 | Iijima ......................... | 310/323 |
| 4,945,275 A | 7/1990 | Honda ........................ | 310/323 |
| 5,005,934 A | 4/1991 | Curtiss ..................... | 350/96.15 |
| 5,140,214 A | 8/1992 | Kimura et al. ............. | 310/323 |
| 5,311,094 A | 5/1994 | Imasaka et al. ............ | 310/323 |
| 5,396,142 A | 3/1995 | Koblanski ................... | 310/328 |
| 5,412,265 A | 5/1995 | Sickafus ............... | 310/40 MM |
| 5,453,653 A | 9/1995 | Zumeris ..................... | 310/323 |
| 5,563,465 A | 10/1996 | Nakahara et al. ........... | 310/328 |
| 5,627,669 A | 5/1997 | Orino et al. ................ | 359/156 |
| 5,647,033 A | 7/1997 | Laughlin .................... | 385/16 |
| 5,696,421 A | 12/1997 | Zumeris et al. ............ | 310/328 |
| 5,852,337 A | 12/1998 | Takeuchi et al. ........... | 310/328 |
| 5,994,820 A | 11/1999 | Kleindiek .................. | 310/329 |
| 6,072,266 A | 6/2000 | Tomikawa .............. | 310/323.02 |
| 6,097,860 A | 8/2000 | Laor ........................... | 385/17 |
| 6,137,926 A * | 10/2000 | Maynard ..................... | 385/18 |
| 6,295,154 B1 | 9/2001 | Laor et al. .................. | 359/223 |
| 6,297,577 B1 | 10/2001 | Hotomi et al. ............. | 310/330 |
| 6,449,406 B1 * | 9/2002 | Fan et al. ..................... | 385/17 |
| 2001/0040419 A1 | 11/2001 | Behin et al. ............... | 310/309 |
| 2002/0006247 A1 * | 1/2002 | Vaganov ..................... | 385/17 |

OTHER PUBLICATIONS

International Search Report for Application No. PCT/US01/42812, dated Nov. 5, 2002 (mailing date).

\* cited by examiner

*Primary Examiner*—Michael C. Zarroli
(74) *Attorney, Agent, or Firm*—George T. Marcou; Dawn-Marie Bey; Kilpatrick Stockton LLP

(57) ABSTRACT

Systems and methods for actuating optical elements steer a beam in two degrees of freedom in order to efficiently align the beam between a selected input and output. These systems include actuator configurations that have piezoelectric and electromagnetic components, servo control systems, and optical cross connect configurations. The actuable optical elements include reflective surfaces (e.g., mirrors), prisms, lenses, and optical fibers.

27 Claims, 30 Drawing Sheets

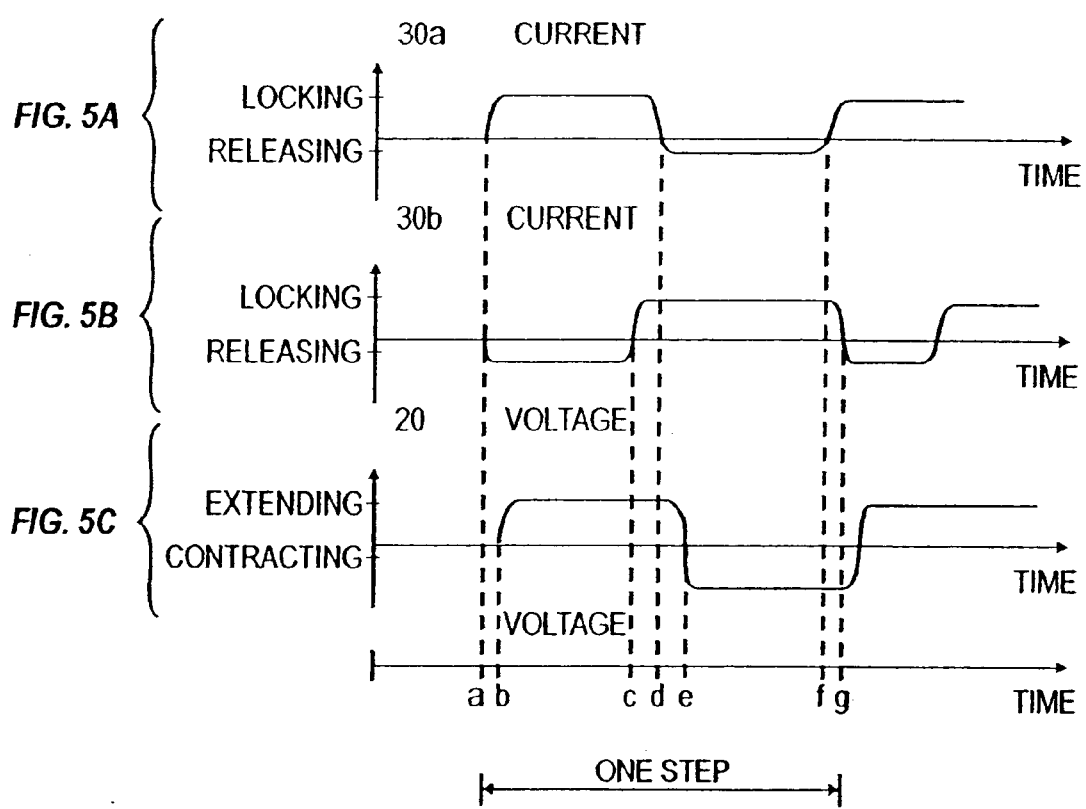

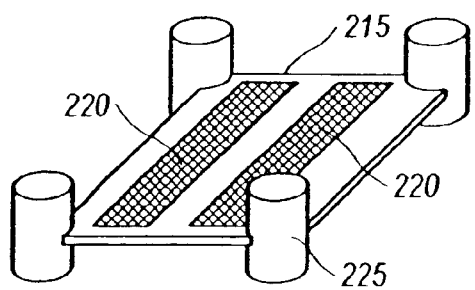
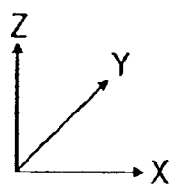
FIG. 11A
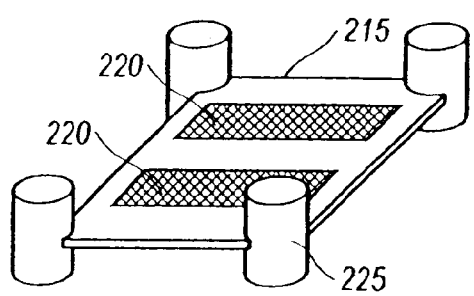
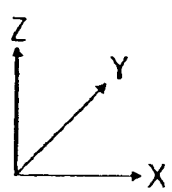
FIG. 11B
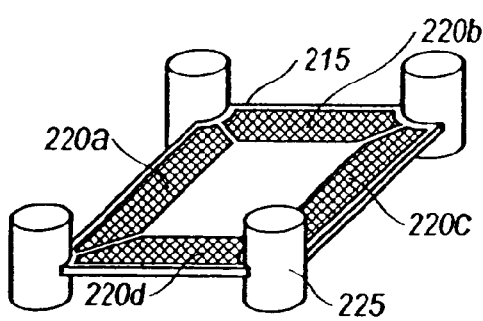
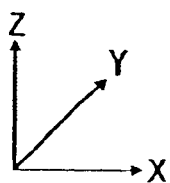
FIG. 11C
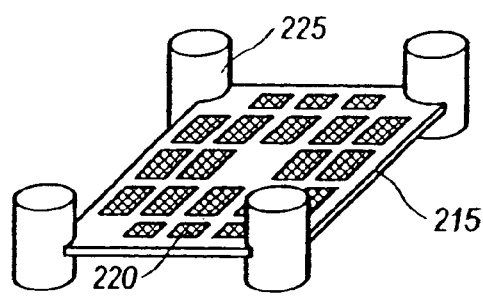
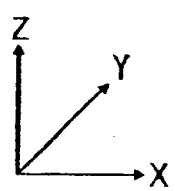
FIG. 11D

A-A

A-A

A-A

A-A

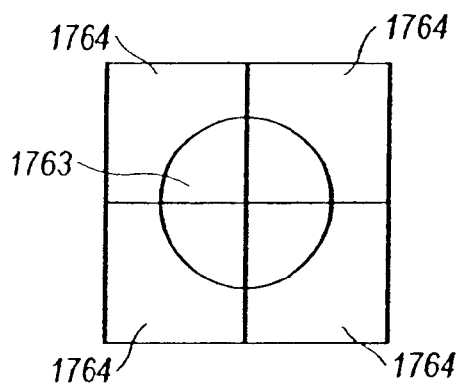
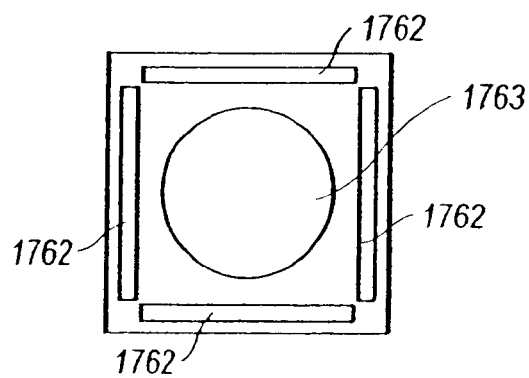
FIG. 32A    FIG. 32B
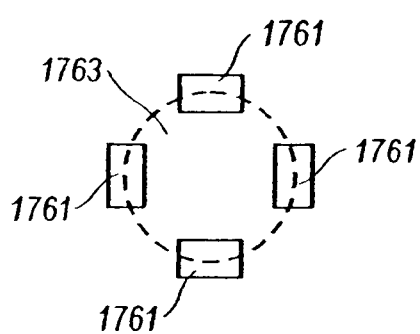
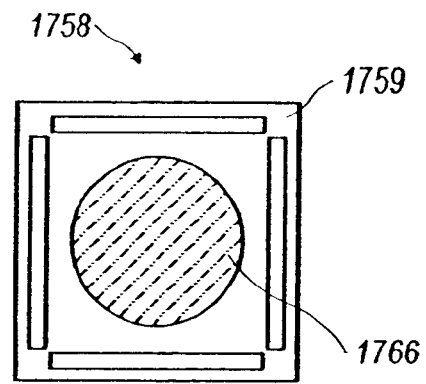
FIG. 32C    FIG. 32D
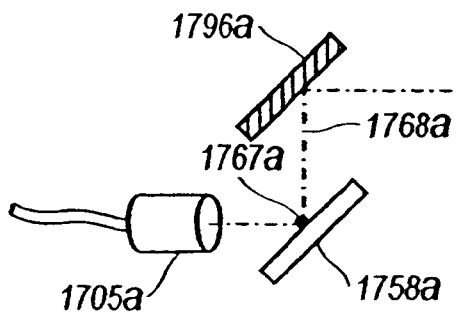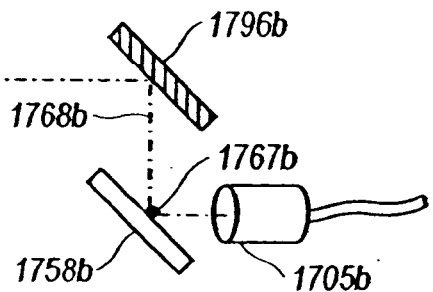
FIG. 33

PIEZOELECTRIC AND ELECTROMAGNETIC ACTUATORS FOR BEAM ALIGNMENT AND SYSTEMS AND METHODS USING THE SAME

CROSS-REFERENCE TO RELATED APPLICATIONS

This application claims priority to and incorporates herein by reference in their entireties the following U.S. Provisional Patent Applications: No. 60/245,746 entitled "Piezoelectric and Electromagnetic Multi Degrees of Freedom Actuator," filed Nov. 3, 2000; No. 60/245,747 entitled "Optical Cross Connect Utilizing Piezoelectric and Electromagnetic Multi Degrees of Freedom Actuator," filed Nov. 3, 2000; No. 60/266,005 entitled "Optical Cross Connect Utilizing Piezoelectric and Electromagnetic Multi Degrees of Freedom Actuator," filed Feb. 2, 2001; and No. 60/309,881 entitled "Optical Cross Connect" filed Aug. 8, 2001.

BACKGROUND OF THE INVENTION

1. Field of the Invention

The present invention generally relates to optical communication systems. More particularly, the present invention relates to actuators utilized in optical communication systems such as optical cross connects ("OXCs") for use in fiber optics communications.

2. Description of the Related Art

In the field of optical communications, the industry is constantly striving to improve the quality of optically communicated information and improve the efficiency with which this information is communicated. While there are methods and systems for steering beams of light, the actuating and alignment mechanisms utilized within these systems remain inefficient. Further, many of the current beam steering systems are not suitable for optical communications applications, such as optical cross connects (OXCs). For example, U.S. Pat. No. 5,696,421 to Zumeris et al., incorporated herein by reference, describes a spherical element driven in two degrees of rotation by four indirectly connected piezo actuators and U.S. Pat. No. 4,727,728 (the '728 patent) to Staufenberg, Jr. et al., incorporated herein by reference, describes a spherical element movable in two degrees of rotation by three piezoelectric transducers. The '728 patent also discloses the use of a mirror attached to the spherical element to direct a laser beam. Both of the above mentioned patents used a vibratory driver comprised of a piezoelectric element that is made to move (or to move another part) by the vibrations generated in the piezoelectric element.

Conventional vibratory drivers are described in U.S. Pat. No. 4,019,073 to Vishnevsky et al., U.S. Pat. No. 5,453,653 to Zumeris and U.S. Pat. No. 5,140,214 to Kimura et al., each of which is incorporated herein by reference in its entirety. Actuation is effected by a piezo element when the piezo element is made to move in an oscillatory motion. The oscillations are made to create stronger friction in one direction. For example, in one part of the oscillation the piezo element is moving slowly, dragging a movable part, while in the reverse the piezo element moves fast, causing a slip of the friction surface due to the inertia of the moving part. This mode of drive is referred to herein as point vibration actuating.

Another conventional way of creating motion is by using standing or moving vibration waves that travel parallel to the contact area between a moving part and a stationary part of an actuating system. The moving part and the stationary part touch each other in a series of points along a pre-established contact area. In a conventional system, a piezoelectric transducer creates the vibration waves and creates the motion. The actuation effectively results from a shortening or elongating of the distance between the points where the stationary part and the moving part touch each other. Examples of systems utilizing standing or moving vibration waves are shown in U.S. Pat. No. 4,882,500 to Iijima disclosing linear and rotational actuators, while U.S. Pat. No. 6,072,266 to Tomikawa describes two degrees of perpendicular motion using such driving mechanism. These patents are incorporated herein by reference in their respective entireties. This mode of actuating is referred to herein as surface vibration actuating.

Yet another conventional method of creating relative motion is by creating ultrasonic waves in a piezoelectric material. These are traveling waves. The crests of the waves are in contact with the moving part and create a driving force. Examples of this type of motion creation are described in U.S. Pat. No. 5,311,094 to Imasaka et al., U.S. Pat. No. 4,945,275 to Honda and U.S. Pat. No. 4,739,212 to Imasaka et al., each of which is incorporated herein by reference in its entirety. The frequency usually used to drive these actuators is in the ultrasonic range, and these type of drivers are referred to herein as ultrasonic actuators.

Piezoelectric materials posses non-diagonal elements of the tensor of elasticity that are non-zero. This phenomenon causes a piezoelectric material to change dimensions upon application of electric field to the piezoelectric material. A single-crystal piezoelectric material has an electric polarization vector built-in due to the crystalline structure. A ceramic piezoelectric material is poled with high voltage to arrange the small crystalline domains in one direction prior to use as an actuating material. FIG. 1A shows a piezoelectric material coated on two sides with conducting layers. In FIG. 1A, only one layer is visible while the second layer is coated on the opposing side of the piezoelectric material. Electrical wires are connected to the conducting layers, making these conductive layers equivalent to first and second electrodes.

Referring to FIG. 1B, a side view of the structure illustrated in FIG. 1A, the first and second electrodes are visible. The electric polarization vector is along the Z dimension. When positive or negative voltage is applied between the first and second electrodes, as in FIGS. 1C and 1D, an electric field is imposed between the first and second electrodes, along the Z dimension. As shown in FIG. 1C, the electric field causes the piezoelectric material to expand in the X and Y dimensions, and contract in the Z dimension. As shown in FIG. 1D, a reversed electric field causes the piezoelectric material to contract in the X and Y dimensions and expand in the Z dimension. In this embodiment, the electrodes are thin so as to comply with the dimension changes of the piezoelectric material.

Referring to FIG. 2, a mechanism using the piezoelectric phenomenon for linear motion is illustrated, as shown in U.S. Pat. No. 3,902,084 to William May, Jr., incorporated herein by reference in its entirety. A movable shuttle is a cylindrical rod. The shuttle is rigid and does not change dimensions. The shuttle is inserted into a hollow comprised of clamps that can be made to contract with proper voltage applied, gripping on the shuttle. When not clamped, the clamps slide freely on the shuttle. There is also a tube, having clamps attached at either end, that may elongate or contract along the cylindrical axis, with application of the proper voltage. By applying voltages in a specified order through electrodes and wires, the shuttle is made to travel right or left. Each step is very small, on the order of a micrometer. The motion resolution is a small fraction of one step and is in the nanometer range. In each step, one clamp is made to contract, the tube is extended (or contracted) and then the other clamp is contracted. Then the first clamp is released, and the tube contracts (or extends). The result is a movement of the shuttle relative to the tube/clamps cylinder. When several steps are taken, the motion is similar to the movement of an inch worm, therefore the trade name of the product. The cost of this product is quite high, due to the fine and accurate surface finish required on the surfaces in contact. The shuttle and grippers are usually lapped and polished ceramic parts. The reason is that the grippers can contract in diameter a very small amount, a few micrometers at most.

U.S. Pat. No. 5,563,465 issued to Nakahara et al. and incorporated herein by reference in its entirety, describes a mechanism where piezoelectric element can, when elongated, contact a shuttle at an angle and push it. Several elements are aligned in different directions to enable movement in two directions, along one degree of freedom.

U.S. Pat. No. 5,396,142 issued to Koblanski and incorporated herein by reference in its entirety, shows a piezoelectric mechanism that creates waves in a coupling member that pushes a shuttle.

U.S. Pat. No. 5,994,820 issued to Kleindiek and incorporated herein by reference in its entirety, describes tube shaped actuator with a slider consisting in part of elastic material that controls the friction forces.

U.S. Pat. No. 4,422,002 issued to Binnig et al. and incorporated herein by reference in its entirety, shows a moving mechanism with two degrees of freedom. In FIG. 3, as it appears in the Binnig et al. patent, the shuttle is a flat part contacting three legs. Application of electrostatic voltage between the legs and the shuttle creates clamping forces. The difficulty with such design is that electrostatic forces are small and quite high voltages will be needed. The actuator systems described above are affected by outside environmental forces such as shock and vibrations. As such, it is important to hold the actuator shuttle in place against these forces; and, voltage should be applied at all times to hold the clamps locked. The electrostatic clamping described by Binnig et al. will not be sufficient to hold the shuttle in place even if it is applied at all times.

BRIEF SUMMARY OF THE INVENTION

The embodiments of the invention described herein set forth piezoelectric motors, actuator configurations, optical cross connect ("OXC") configurations and alignment/servo systems, as well, as the methods for using the same, either alone or in various combinations.

An embodiment of the present invention describes an actuator comprising a piezoelectric element having at least one electrode on two opposing surfaces thereof, at least two magnetic elements contacting the piezoelectric element; and a shuttle, wherein movement of at least one of the piezoelectric element, the at least two magnetic elements, and the shuttle is electromagnetically controllable by the piezoelectric element and the at least two magnetic elements.

Another embodiment of the present invention describes a beam steering unit comprising a first and a second piezoelectric element, a frame, a base wherein the frame is rotatably attached to the base, and at least one movable optical element, wherein the at least one movable optical element is rotatably attached to the frame, and further wherein the first piezoelectric element operates to move the frame in a first degree of freedom and the second piezoelectric element operates to move the at least one movable optical element in a second degree of freedom, such that a beam impinging upon the movable optical element is steerable in two degrees of freedom.

A further embodiment of the present invention describes an optical cross connect comprising a first and a second modular unit, wherein each of the first and second modular units includes a predetermined number of beam steering units and a predetermined number of beam generating units, such that there are an equal number of beam steering units and beam generating units within each of the first and second modular units, and at least one input fiber for supplying a transmission signal to at least one of the predetermined number of beam generating units of the first modular unit and at least one output fiber for receiving the transmission signal from at least one of the predetermined number of beam generating units of the second modular unit, wherein each of the predetermined number of beam steering units includes at least two piezoelectric elements and at least one movable optical element for steering the transmission signal in two degrees of freedom.

A still further embodiment of the present invention describes a method for steering a data signal through an optical system comprising receiving a data signal from an input fiber, generating a data beam from the data signal via a first beam generating unit, determining an output fiber to which the beam is to be directed, adjusting the direction of the beam via at least one beam steering unit, transforming the data beam back into the data signal via a second beam generating unit, and receiving the data signal into an output fiber, wherein the at least one beam steering unit includes at least two piezoelectric elements and at least one movable optical element for steering the data beam in two degrees of freedom.

For each of the systems and methods described herein, when light is made to travel from an input unit to an output unit via, for example, beam generating units and beam steering units, light can also travel in the reverse direction, from the output unit to the input unit. There is a full symmetry between the input and output units. However, the terms "input" and "output" are used throughout the specification for ease of explanation, without limit of the applicability of the described system for light transmission in the reverse direction or for light transmission in both directions simultaneously.

BRIEF DESCRIPTION OF THE DRAWINGS

In the Figures:

FIGS. 5A–5C illustrate current and voltage patterns for an actuator according to an embodiment of the present invention;

FIGS. 11A–11D illustrate piezoelectric actuators according to an embodiment of the present invention;

FIGS. 32A–32D illustrate servo system detectors according to an embodiment of the present invention;

FIG. 33 illustrates a servo system according to an embodiment of the present invention;

DESCRIPTION OF THE PREFERRED EMBODIMENTS OF THE PRESENT INVENTION

The following embodiments exemplify the use of piezoelectric expansion and contraction for movement, and electromagnetic forces for clamping, according to the present invention.

Figure 1A:
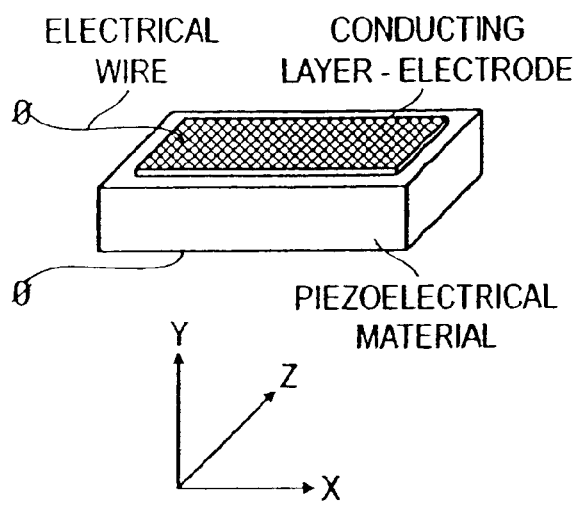
FIGS. 1A–1D illustrate a conventional piezoelectric actuator.
Figure 1B:
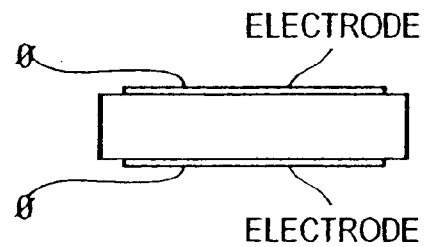
Figure 1C:
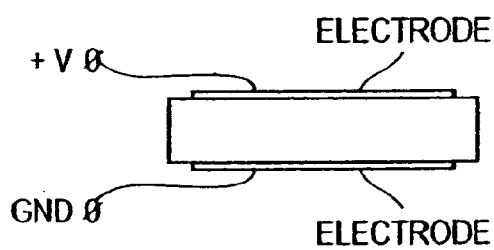
Figure 1D:
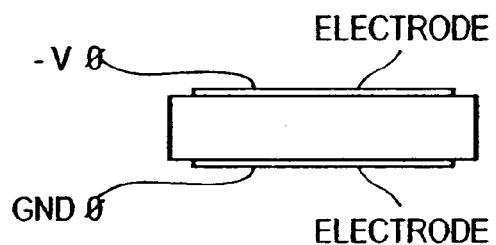
Figure 2:
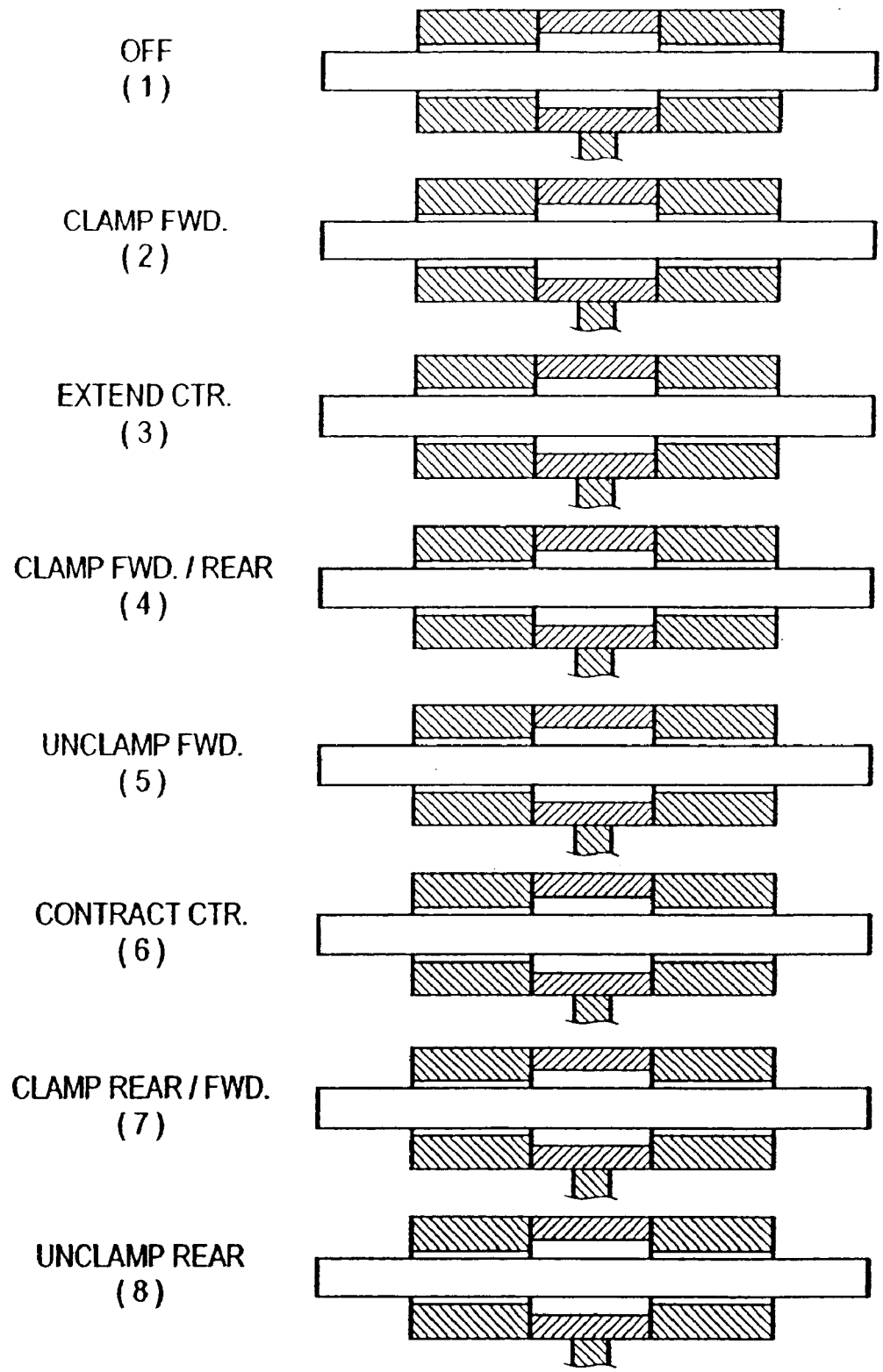
FIG. 2 illustrates a conventional piezoelectric linear actuator.
Figure 3:
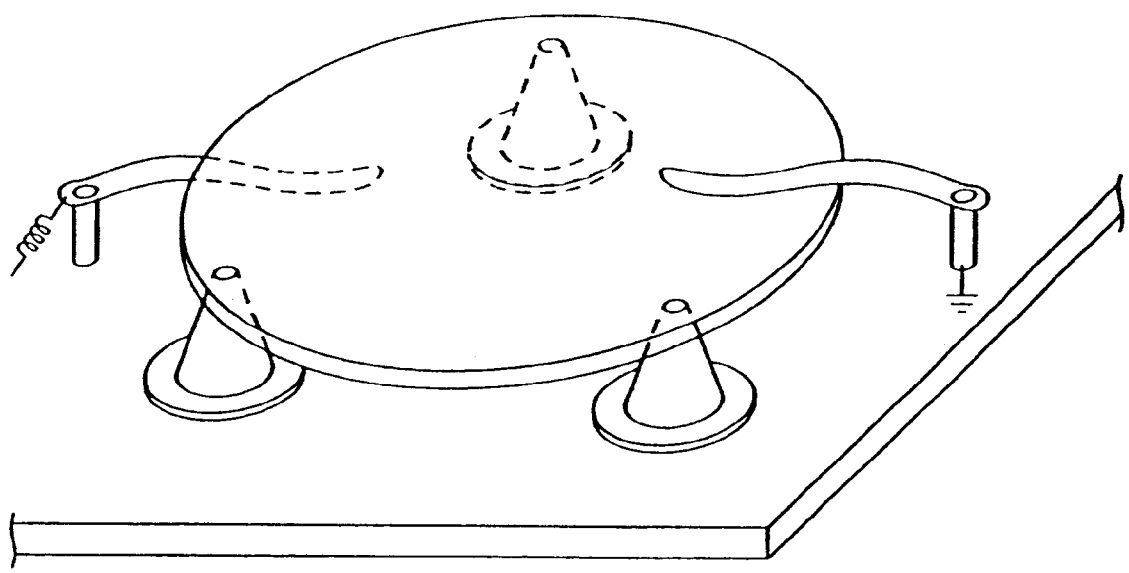
FIG. 3 illustrates a conventional piezoelectric actuator.
Figure 4A:
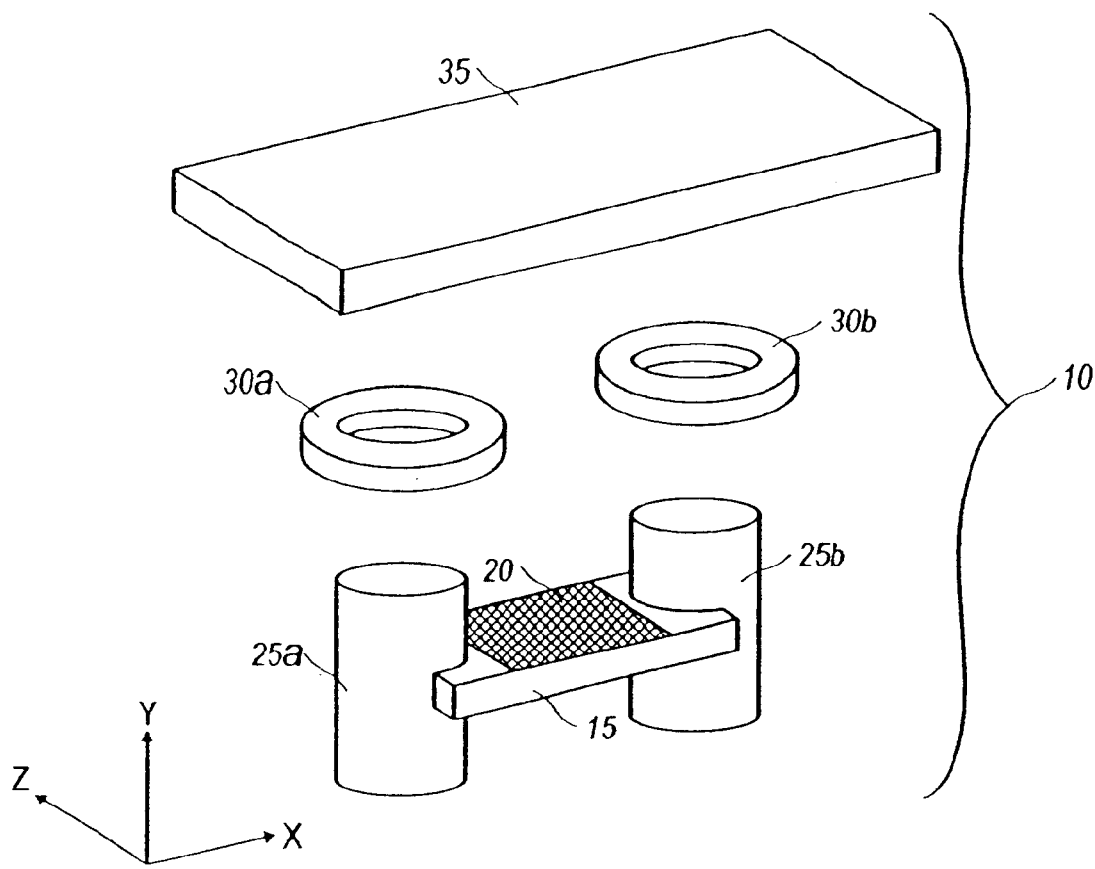
FIGS. 4A–4B illustrate a piezoelectric actuator according to an embodiment of the present invention.
Figure 4B:
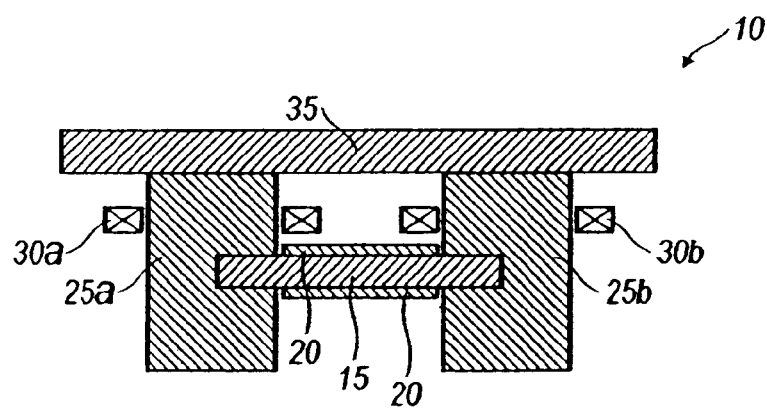

Referring to FIGS. 4A and 4B there is shown a design of an actuator 10 according to an embodiment of the present invention. FIG. 4A is an exploded view and FIG. 4B is a cut-away. The actuator 10 includes a piezo element or piezoelectric motor (hereafter piezoelectric motor) 15 comprised of piezo ceramic such as, PZT (lead zuconate titanate), or the like, coated on two opposing sides with conducting material to form electrodes 20. The electrodes may be, for example, gold (Au), nickel (Ni), chromium (Cr) or some combination thereof or an alloy such as silver-palladium, silver-platinum, and platinum-palladium produced by electroless plating or deposited by sputtering. Further examples of piezoelectric materials and electrode materials are found in U.S. Pat. Nos. 6,297,577 and 5,852,337, which are incorporated by reference herein in their entireties. By applying a voltage between the electrodes, the piezoelectric motor extends or contracts along the X dimension. Two poles 25a and 25b are attached to the piezoelectric motor through any one of various attachment methods such as gluing, soldering or brazing. For soldering or brazing, the contacting surfaces of the piezoelectric motor are coated with a metallic layer. The poles 25a and 25b are made of magnetic conducting material, such as steel. In an alternative embodiment of the present invention, the poles 25a and 25b are permanent magnets. Each pole 25a and 25b has a coil 30a and 30b wrapped around it such that current can be applied through the coils creating magnetic fields. Suspended above the piezoelectric motor and the poles is a shuttle 35, completing the actuator, comprised of a magnetic conducting material, such as steel.

In an embodiment of the present invention, the actuator 10 is in a rest state when no voltage is applied to the electrodes 20 and no current flows through the coils 30a and 30b. Due to magnetism remaining in the poles 25a and 25b and shuttle 35 from the last voltage driven movement, the shuttle 35 is magnetically attached to the poles 25a and 25b. In an embodiment of the present invention, to move the shuttle, a first coil 30a is energized to create high attraction between the first pole 25a and the shuttle 35 and the second coil 30b is energized with such current so as to cancel the residual magnetism in the second pole 25b. A voltage is applied to the electrodes 20, to extend the piezoelectric motor 15. The second pole 25b slides in the X direction along the shuttle 35. This sliding results because the attractive force between the first pole 25a and the shuttle 35 is large, and the static friction force is high. In addition, the force between the second pole 25b and the shuttle 35 is minimal, and the static friction force is very small. Next, the second coil 30b is energized to highly magnetize the second pole 25b, and attach the second pole 25b strongly to the shuttle 35. The current in the first coil 30a is now adjusted to cancel the magnetism in the first pole 25a. The voltage in the electrodes 20 is now adjusted to contract the piezo element 15. Upon this contraction the shuttle 35 moves in the negative X (−X) direction. This extension and contract of the actuator 10 constitutes actuation. The distance and direction that the shuttle 35 moves can be varied by varying the sequence of currents and voltages applied to the electrodes.

In the embodiment described above, the actuator operation assumes that the first pole 25a is stationary in space. A similar relative motion is possible with the second pole 25b being stationary or the shuttle 35 being stationary. In these embodiments, it is the relative motion between the poles 25a and 25b, piezoelectric motor 15 and the shuttle 35 that results in actuation. An exemplary set of current and voltage patterns for an actuating mechanism according to the embodiment of the present invention described above is shown in FIGS. 5A–5C. The current graph in FIG. 5A is the current in the first coil 30a versus time. There are two levels of current. Locking current enhances the magnetism in the first pole 25a to hold firm onto the shuttle 35. Releasing current is in the reverse direction, and is made to cancel the magnetic force between the elements, i.e., poles and the shuttles. The current graph in FIG. 5B is the current in the second coil 30b versus time, and is similar to the current graph 5A in that the current may be locking current or releasing current. The currents in 5B are different timed then the currents in 5A. The electrode graph in FIG. 5C shows the voltage applied to the piezoelectric motor and a timing sequence. This electrode voltage graph shows voltages needed to either extend or contract the piezoelectric element. The timing sequence applies to all FIGS. 5A to 5C. Referring to the timing sequence, the actuator is at rest until time a, at which point currents are applied to lock the first pole 25a and release the second pole 25b. It takes some predetermined amount of time to ramp the currents into the coils and at time b an electrode voltage is applied to extend the piezoelectric motor 15. After the extension is complete, at time c, the second pole 25b locks and after this locking is accomplished, at time d, the first pole 25a is released. As is illustrated, the time for the piezo element extension is longer since there is a need to move a mass and to overcome inertia. After the first pole 25a is released, at time e the voltage on the electrodes is reversed to contract the piezoelectric motor 15. The contraction is accomplished at time f, and the first pole 25a is locked. Following that at time g, the second pole 25b is released and the actuator is poised for the next actuation step.

In an alternative embodiment of the present invention, by reversing the timing order of the step described above, the actuator is made to create motion in the reverse direction. Similarly, through application of a smaller voltage on the electrodes, a smaller motion can be achieved, resulting in increased positioning control, i.e., on the order of nanometers.

Figure 6A:
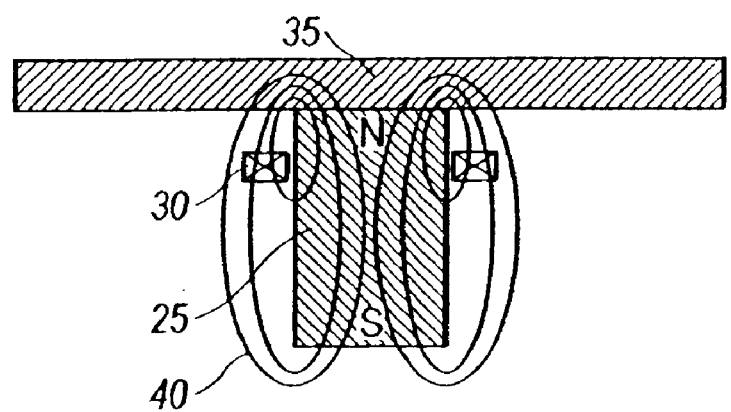
FIGS. 6A–6B illustrate magnetic flux lines for a piezoelectric actuator according to an embodiment of the present invention.
Figure 6B:
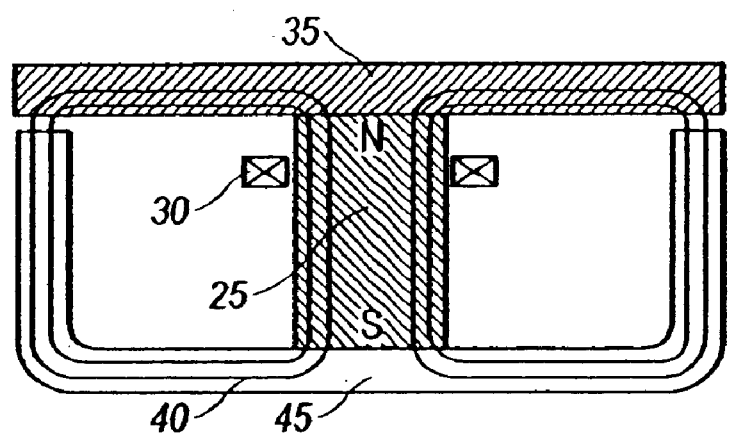

The poles and shuttle are made of, for example, Iron (Fe), Cobalt (Co), Nickel (Ni) or their compounds. Magnetizable ceramics may be used as well. The poles or the shuttle may be made of a permanent magnet, thus improving the holding force without any current in the coils 30. Referring to FIGS. 6A and 6B, the magnetic flux lines 40 are shown for the pole 25 design of FIG. 4. In FIG. 6B a yoke 45, made of magnetic conducting material, such as steel is incorporated into the actuator such that the magnetic flux lines 40 travel most of their length in highly conducting material. This path of the field lines 40 results in a stronger magnetic flux than in FIG. 6A and therefore a stronger force between the pole 25 and the shuttle 35. If the shuttle 35 is a magnet or has sufficient residual magnetic force, the applied current to the coil 30 creates a repulsion force between the pole 25 and the shuttle 35, creating a small separation between them. This allows for a friction-free motion operation.

Figure 7A:
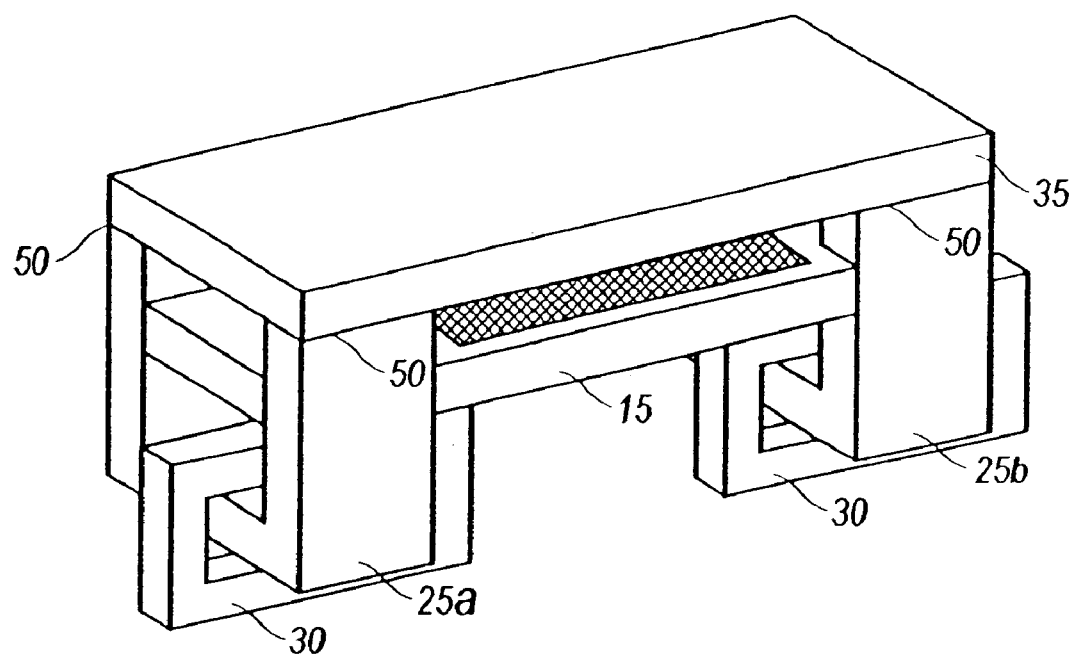
FIGS. 7A–7B illustrate a pole design for a piezoelectric actuator according to an embodiment of the present invention.
Figure 7B:
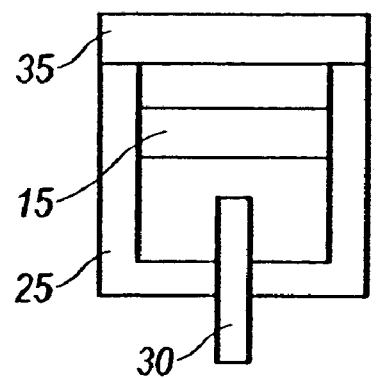

Referring to FIGS. 7A and 7B an alternative pole design according to an embodiment of the present invention is shown, wherein each pole 25a, 25b touches the shuttle 35 in two locations 50 and therefore there is extremely small travel of the magnetic flux lines 40 in air. FIG. 7A is an isometric view and FIG. 7B is a side view. The shuttle 35 and poles 25a, 25b are flat in order to touch in four locations, two for each of the two poles 25a, 25b. The poles 25a, 25b and the shuttle 35 may be lapped flat and the residual non-flatness will be absorbed by the flexibility of the materials. Movement of the poles 25a, 25b is facilitated by piezoelectric motor 15.

Figure 8:
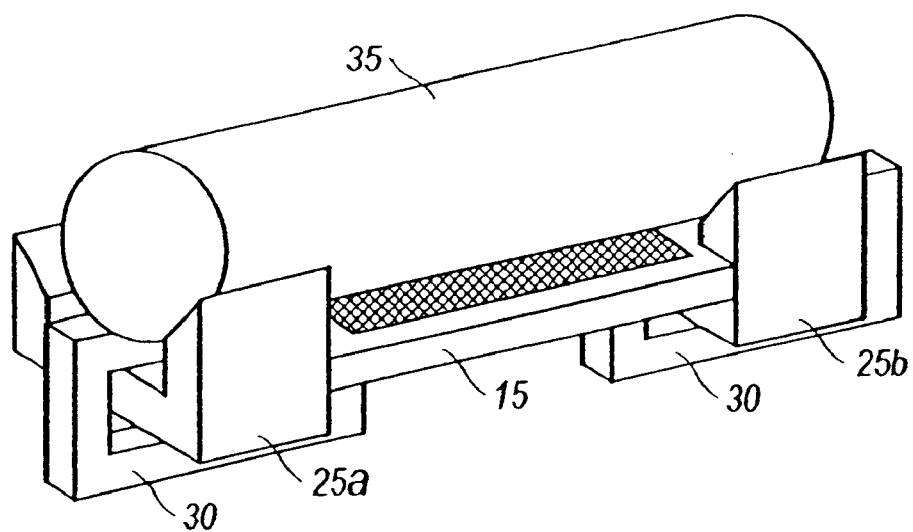
FIG. 8 illustrates a piezoelectric actuator according to an embodiment of the present invention.

Referring to FIG. 8, in an alternative embodiment of the present invention, the shuttle 35 is cylindrical and the poles 25a, 25b have a V-groove shape in the areas contacting the shuttle 35. This structure confines the shuttle to movement in one dimension only.

Figure 9:
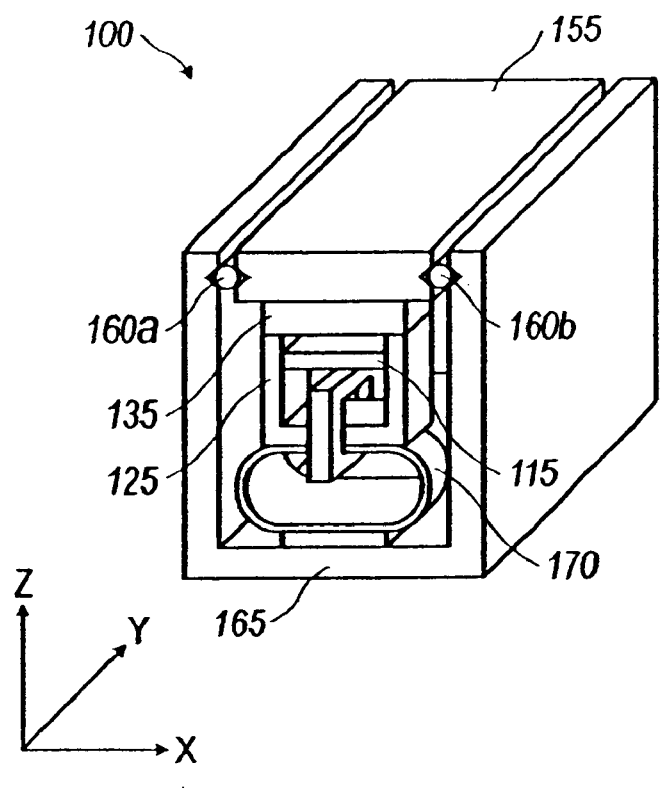
FIG. 9 illustrates a piezoelectric actuator according to an embodiment of the present invention.

An example of a linear actuator 100 using a piezoelectric motor 115 according to an embodiment of the present invention is seen in FIG. 9. The shuttle 135 is connected to a sliding mechanism 155, which can slide along the Y-axis on linear ball bearings 160a, 160b positioned between the sliding mechanism 155 and a U-shaped base 165. The pole 125 that is visible in FIG. 9, is attached to the base by a leaf spring 170. The leaf spring 170 allows the pole 125 to move freely in the Z-axis, allows small movement in the X-axis, and confines the pole 125 in the Y-axis. In this embodiment, the movement of the shuttle 135 is in the Y-axis relative to the visible pole 125 and relative to the base 165. The invisible pole (not shown) is held in place with springs that allow for free motion in the Y-axis, thereby allowing for the expansion and contraction of the piezoelectric motor 115.

Figure 10A:
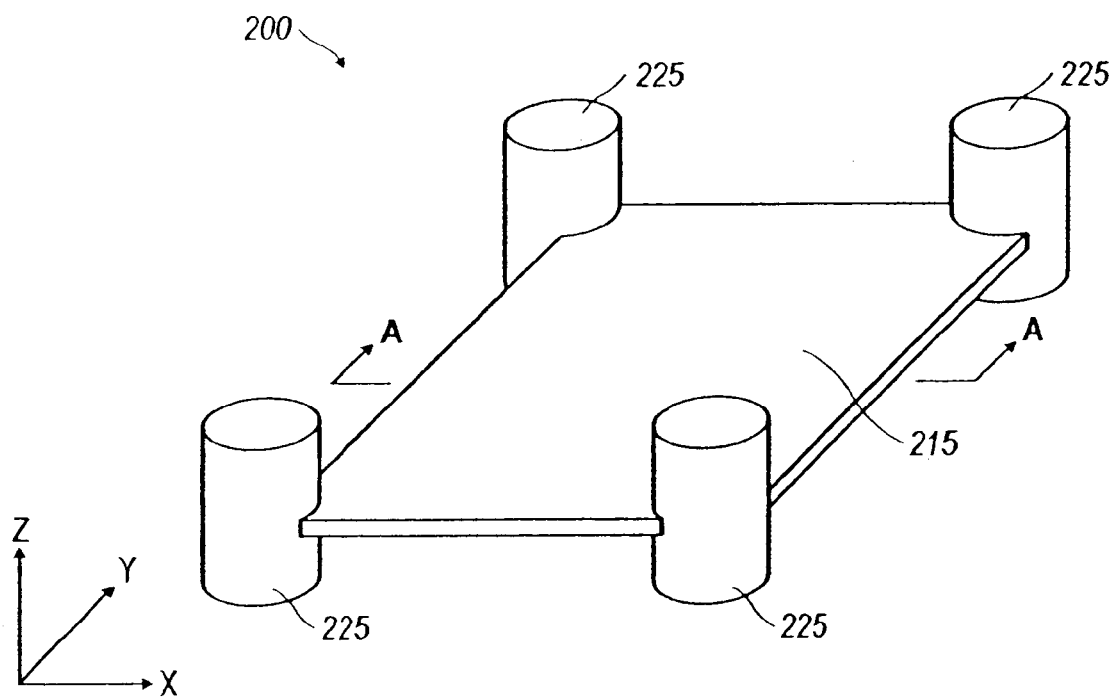
FIGS. 10A–10B illustrate a piezoelectric actuator according to an embodiment of the present invention.
Figure 10B:
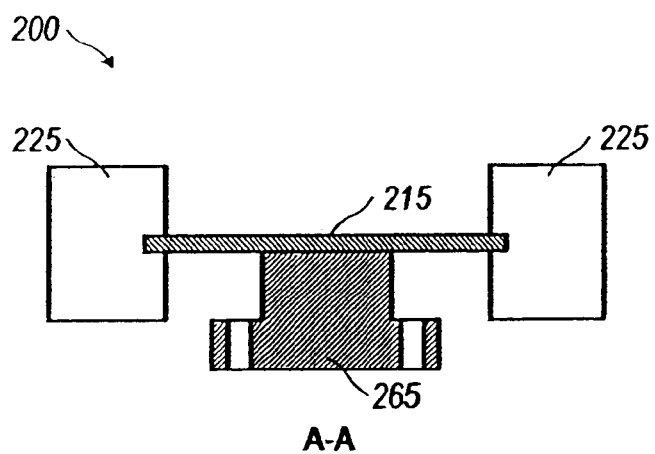

Referring to FIGS. 10A and 10B, an actuator 200 moving in two degrees of freedom is constructed using the principles of the present invention described above in reference to the one-degree of freedom actuator. For clarity, the electrodes, coils and shuttle are not shown, but one skilled in the art recognizes the necessary configuration of these elements within the actuator. FIG. 10A is an isometric view and FIG. 10B is a cut-away. Referring to FIG. 10A, there are four poles 225 attached to a piezoelectric motor 215. By changing the dimensions of the piezoelectric motor 215 through expansion and contraction, the distance between poles 225 is changed, enabling motion. The base 265, shown in FIG. 10B, attaches to the center of the piezoelectric motor 215 and creates a stable location from which all motion is referenced. Coils and shuttle (not shown) are similar to those described above.

FIGS. 11A–11D illustrate various actuator embodiments wherein electrodes 220 are deposited on the piezoelectric motor 215 in a variety of patterns. In FIG. 11A, the electrodes 220 enable motion in the X-axis. In order to create motion relative to the central base (not shown), when one of the electrodes in the pair is causing contraction of the piezoelectric motor 215 under it, the second electrode of the pair causes expansion. In FIG. 11A, while all poles 225 are holding, creating expansion at the electrode on the left and contraction at the electrode on the right causes a shuttle to move in the −X direction. The two poles 225 on the right are then released and the electrode on the right causes extension, sliding the two poles 225 on the right to the +X direction. The poles 225 on the right then hold, the poles 225 on the left release, and the poles 225 on the left slide in the +X direction by contraction at the electrode on the left. This step is repeated as necessary to affect the desired movement of the actuator. Similar processes are applied to achieve motion of the shuttle in the Y-axis using the electrodes 220 shown in FIG. 11B.

The electrodes 220 in FIGS. 11A and 11B are deposited onto the same piezoelectric motor 215 with an insulation layer in-between, a technology common in multi-layer thick film or thin film ceramic printed wiring boards. In this way one can structure a piezoelectric motor 215 that is similar in shape to the electrodes 220 visible in FIGS. 11A and 11B. In the embodiments of 11A to 11D, a single large electrode covers the whole area of one side of the piezo element, and is used as a ground electrode. In each of the electrode configurations, the center portion of the piezo element does not have any electrode so as not to stress the area that is attached to the base. FIG. 11C illustrates an electrode configuration that facilitates rotation of the shuttle around the Z-axis. By applying contracting (expanding) voltage on electrodes 220A and 220C while applying expanding (contracting) voltage on electrodes 220B and 220D, the movement of the poles is such that the shuttle will rotate. An X-Y-Theta actuator can be constructed with three layers of electrodes, as shown in FIGS. 11A, 11B and 11C. Alternatively, as shown in FIG. 11D, a pattern of multiple electrodes may be deposited wherein each electrode is driven individually to create the desired X-Y-Theta motion.

Figure 12A:
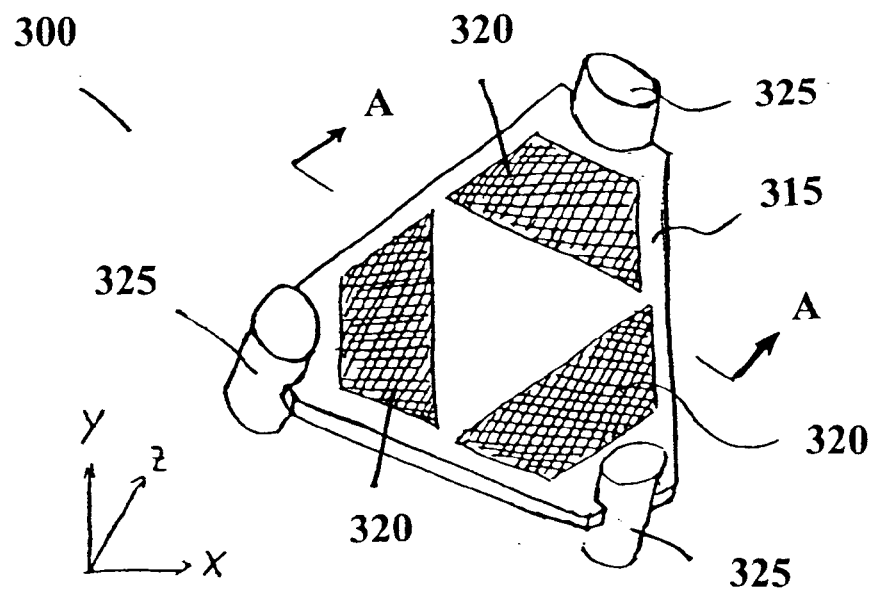
FIGS. 12A–12B illustrate a piezoelectric actuator according to an embodiment of the present invention.
Figure 12B:
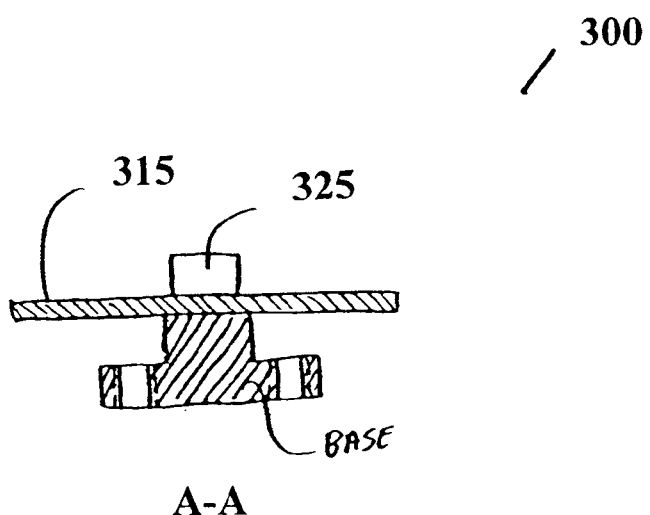

FIGS. 12A–12B illustrate a triangular actuator 300 with three poles 325 according to an embodiment of the present invention. FIG. 12A is an isometric view and FIG. 12A is a cut-away view. The structure of FIGS. 12A and 12B achieves linear motion of the shuttle in a plane and rotational motion along an axis perpendicular to the plane. The linear motion is along three lines at 120 degrees to each other, wherein one pole works against the two opposing poles under control of electrodes 320. The degrees of freedom are similar to those of FIGS. 10A and 10B and 11A–11D. Any required motion of the shuttle in a plane can be achieved by separating the required motion into two vectors with 120 degrees between them, and then applying the motion to the shuttle. One skilled in the art recognizes that it is possible to use more than four poles, even hundreds of poles, to create linear motion in two axes and rotational motion around an axis perpendicular to the first two according to the teachings of this invention.

Figure 13A:
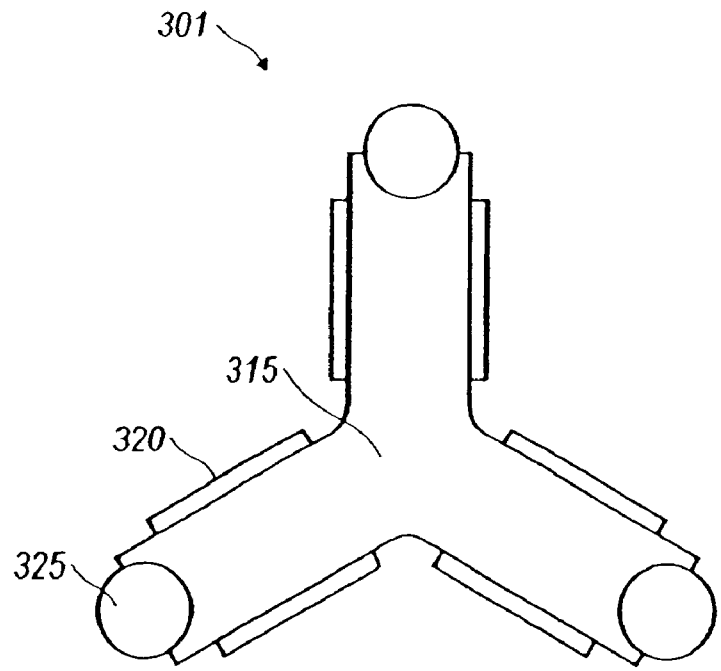
FIGS. 13A–13B illustrate piezoelectric actuators according to an embodiment of the present invention.
Figure 13B:
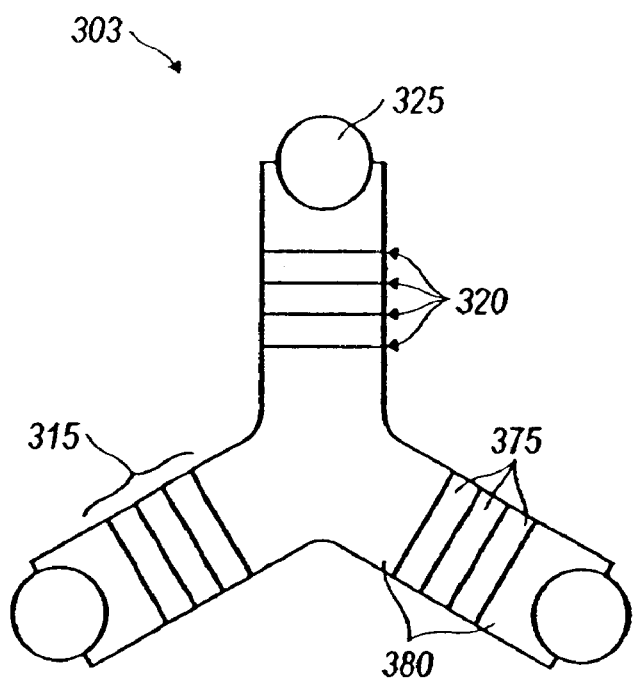

FIGS. 13A and 13B illustrate two additional three-pole actuators 301, 303 wherein the electrodes 320 are located differently than above. Referring to FIG. 13A, the electrodes 320 are on the side surfaces of the piezoelectric motor 315, while in FIG. 13B the piezoelectric motor 315 is a multi-layer construction with the electrodes 320 between the piezo layers 375. The configuration of FIG. 13B achieves large displacements with low voltage. In FIG. 13B, non-active material 380 is used to connect together the piezoelectric motor/electrode stack 315 and the poles 325.

Figure 14A:
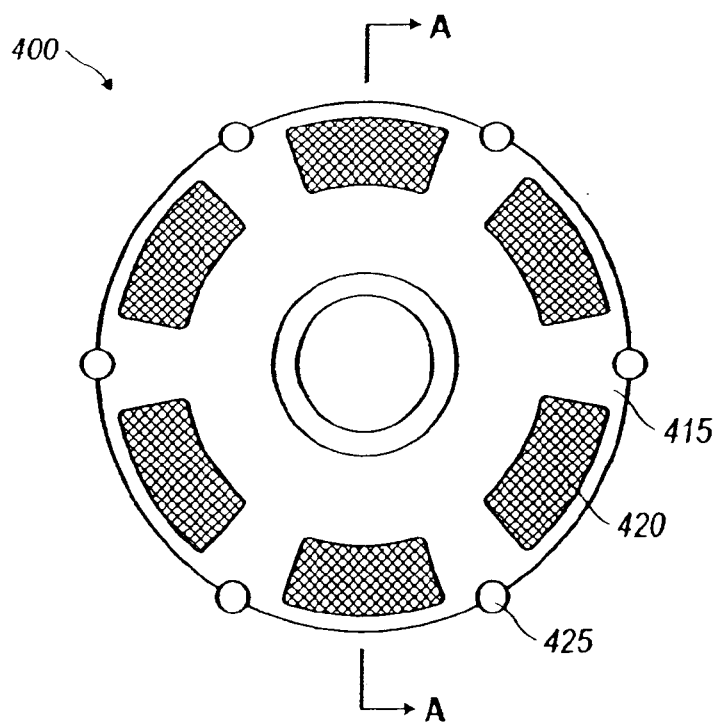
FIGS. 14A–14B illustrate a piezoelectric actuator according to an embodiment of the present invention.
Figure 14B:
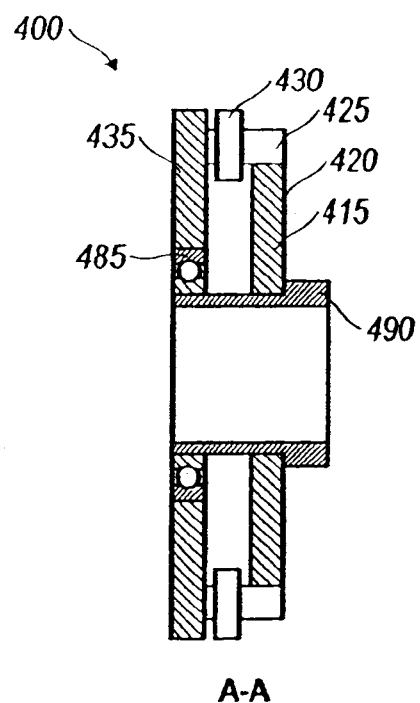

In an alternative embodiment of the present invention, FIGS. 14A and 14B illustrate an actuator 400 for creating rotational motion. FIG. 14A is a top view with the shuttle, coils and ball bearing removed for illustration purposes. FIG. 14B is a cut-away. The piezoelectric motor 415 is circular with multiple poles 425 each surrounded by a coil 430. Although six poles are illustrated, different numbers of poles are possible. The electrodes 420 are deposited between the poles 425, and by extending some electrodes while contracting other electrodes it is possible to achieve circular motion of the shuttle 435. The shuttle 435 is mounted to a ball bearing 485 that is connected to a shaft 490. The shaft 490 is attached to the piezoelectric motor 415. Using this configuration, the shuttle 435 is confined to rotational motion about the shaft 490 axis.

Figure 15:
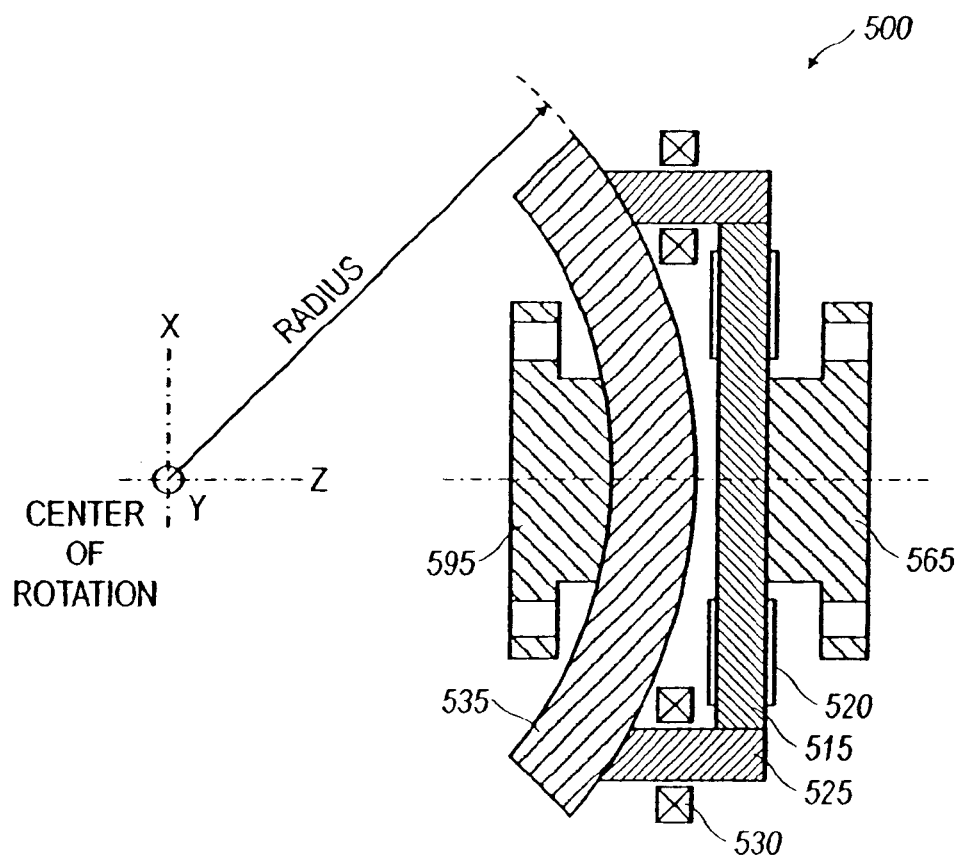
FIG. 15 illustrates a piezoelectric actuator according to an embodiment of the present invention.

Referring to FIG. 15, the actuator 500 illustrated achieves three degrees of rotation. The piezoelectric motor 515, coils 530 and poles 525 are similar to that of FIGS. 14A and 14B, but the poles 525 are cut and polished to have spherical surfaces that touch the shuttle 535. The shuttle 535 is spherical and seated on the poles 525. A mount 595 is attached to the shuttle 535, and is rotated by the shuttle relative to the base 565, which is attached to the piezoelectric motor 515. By applying sequences of voltages to the electrodes 520 and currents to the coils 530, the shuttle 535 is rotated around the X, Y and Z axes. This is similar to the two linear and one rotational motions described in reference to FIGS. 10A–10B and 11A–11D. Due to the spherical shape of the shuttle the linear motion of the poles is converted to rotational motion.

Figure 16:
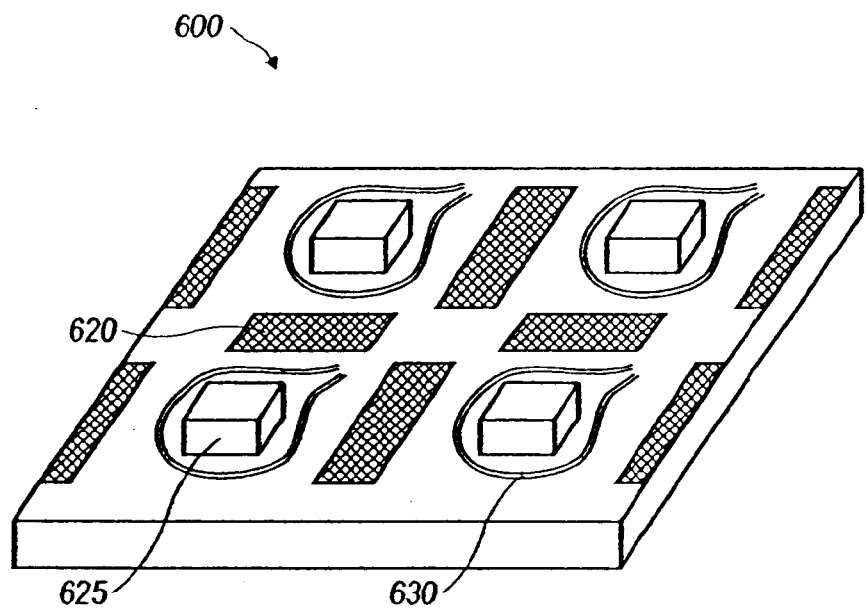
FIG. 16 illustrates a piezoelectric actuator according to an embodiment of the present invention.

Referring to FIG. 16, a part of an actuation chip 600 made utilizing micro electro mechanical systems ("MEMS") technology is illustrated. Using this technology, a silicon wafer is processed in a microelectronics foundry to create tiny mechanical structures, referred to as MEMS. Alternatively, other materials are processable using such technology. The actuation chip 600 in FIG. 16 is preferably made of silicon or other appropriate material, possessing piezoelectric qualities. On the actuation chip 600, poles 625 made of magnetizable material are deposited. Only four poles 625 are shown, but hundreds may be used. Also deposited are electrodes 620 and coils 630. The interconnect wires are not shown for clarity. The shuttle described in reference to other embodiments above is not shown, but may also be fabricated using MEMS processing technology or, alternatively, may simply be a flat piece of steel. The MEMS process is planar in nature, and the top areas of the poles 625 will have high quality flatness. One of the benefits of the MEMS process is that many chips may be manufactured in one process from one wafer (e.g., silicon wafer), making inexpensive mass production possible.

Figure 17:
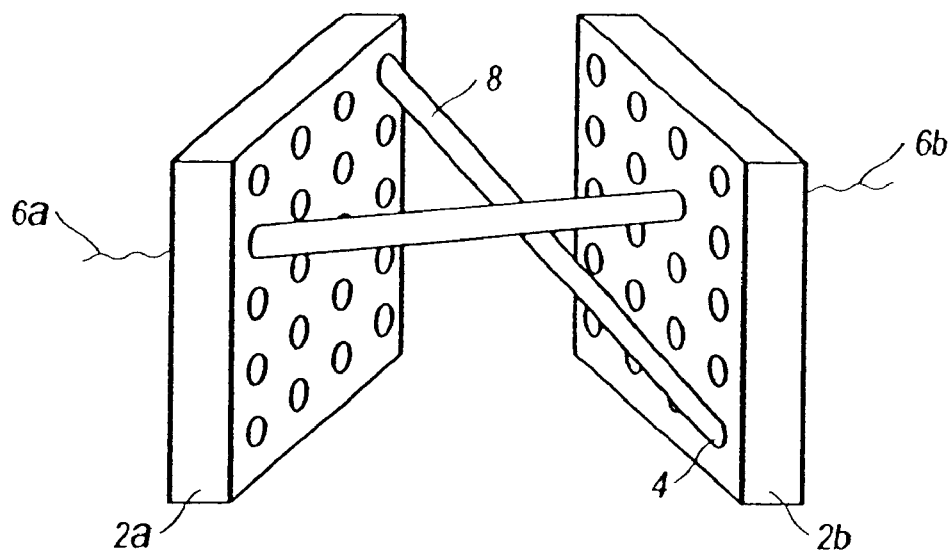
FIG. 17 illustrates a conventional configuration for an optical cross connect (OXC)

The piezoelectric motors, actuator configurations, and alignment/servo systems described herein may be used as elements in conventional optical cross connect ("OXC") configurations such as that shown in FIG. 17. The basic OXC configuration includes two arrays 2a and 2b of beam steering units 4. To each beam-steering unit 4 in a first array 2a there is one input fiber 6a entering, carrying optical communications data in a light signal, e.g., infrared light signal. The beam steering units 4 convert the light traveling in the fiber into a beam 8, and direct the beam 8 from the input fiber 6a, and aim this beam 8 at the opposing array 2b of beam steering units 4. This beam 8 is focused onto an opposing beam steering unit 4 and into an opposing fiber 6b. Auxiliary light sources and light detectors are utilized to sense the direction of the beam 8. This sensing is used for servo controlling the direction of the beam, so it hits squarely on the correct target. When two opposing beam-steering units are aiming at each other, light can pass between the two associated fibers in both directions. There are alternative OXC configurations known to those skilled in the art and these will not be described herein. The piezoelectric motors, actuator configurations, and alignment/ servo systems described herein may be used as elements in these alternative OXC configurations as well.

Figure 18:
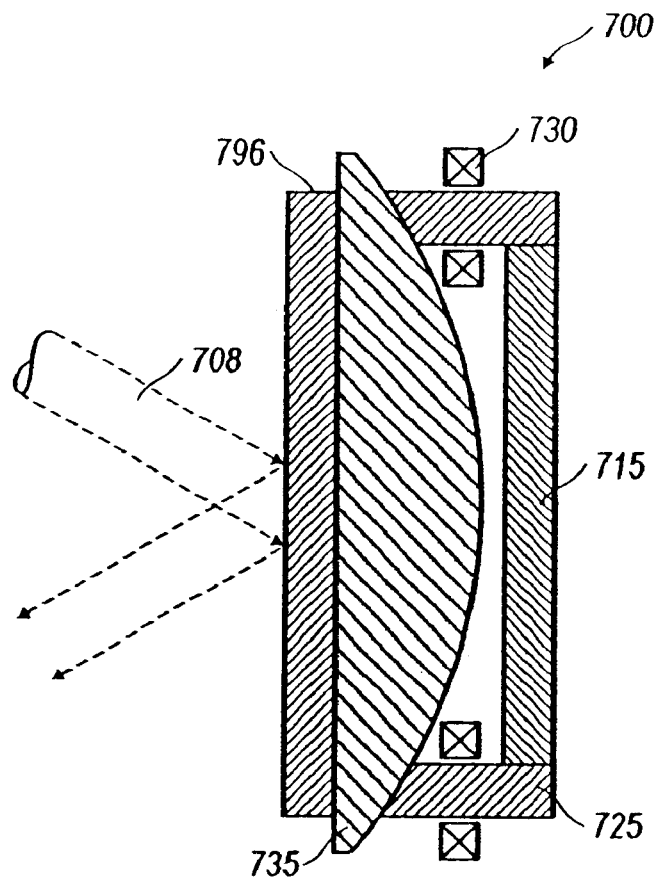
FIG. 18 illustrates a piezoelectric actuator according to an embodiment of the present invention.
Figure 27:
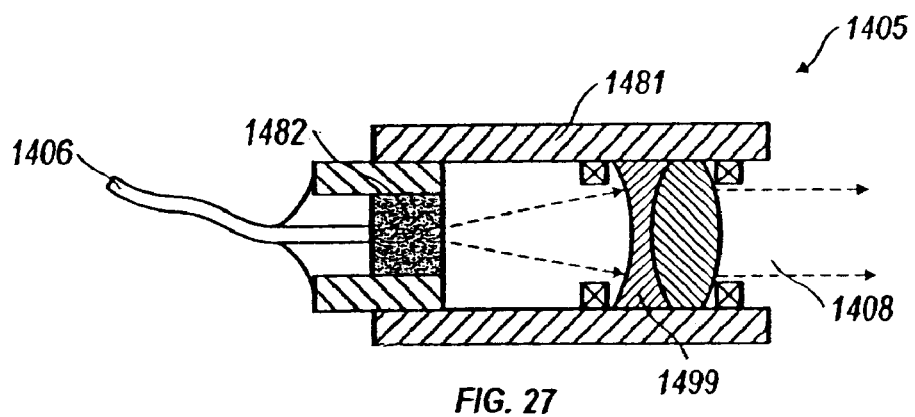
FIG. 27 illustrates a beam generating unit according to an embodiment of the present invention.

FIG. 18 illustrates a piezoelectric-electromagnetic actuator 700 with a reflective surface 796 (e.g., a mirror) attached to the shuttle 735. The shuttle 735 is made to rotate in two degrees of freedom, and thereby an optical beam 708 reflecting from the reflective surface 796 can be controlled in two degrees of freedom. The actuator 700, with reflective surface 796 is a beam steering unit 4 useable in, for example, the OXC configuration of FIG. 17. As described further below, a beam generating unit such as the one described with reference to FIG. 27, is utilized to generate the beam that is ultimately steered by beam steering unit 4. Further, servo control mechanisms, and suitable mechanical structures and electronics are also utilized to implement the actuators and beam steering units described herein.

Figure 19:
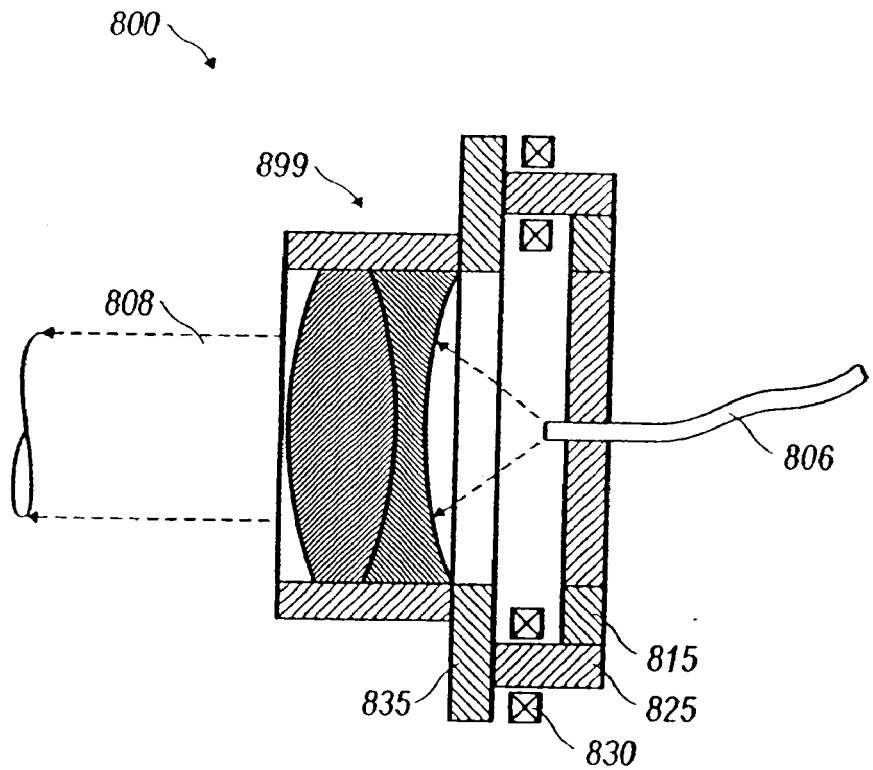
FIG. 19 illustrates a piezoelectric actuator according to an embodiment of the present invention.

FIG. 19 illustrates a two dimensional linear piezoelectric-electromagnetic actuator 800 according to an embodiment of the present invention, that carries at least one fiber 806 attached to the piezoelectric motor 815 and at least one lens 899 attached to the shuttle 835. The lens creates a beam 808 out of the light emerging from the fiber end 806 as a cone. Similarly, the at least one lens 899 can focus a light beam 808 arriving at it into the fiber 806, as the optical system is reversible. By moving the lens 899 relative to the fiber 806, the direction of the emerging light can be changed. Consequently, the actuator 800 is a novel beam-steering unit 4 useable in, for example, the OXC configuration of FIG. 17. The actuator 800 is actuable in one of two ways. In a first method of actuation, the piezoelectric motor 815 with fiber 806 remains stationary in the array of beam steering units 2, while the shuttle 835 with the at least one lens 899 is movable. Alternatively, in a second method of actuation, the shuttle 835 with the at least one lens 899 remains stationary, while the piezoelectric motor 815 with fiber 806 is movable.

Figure 20:
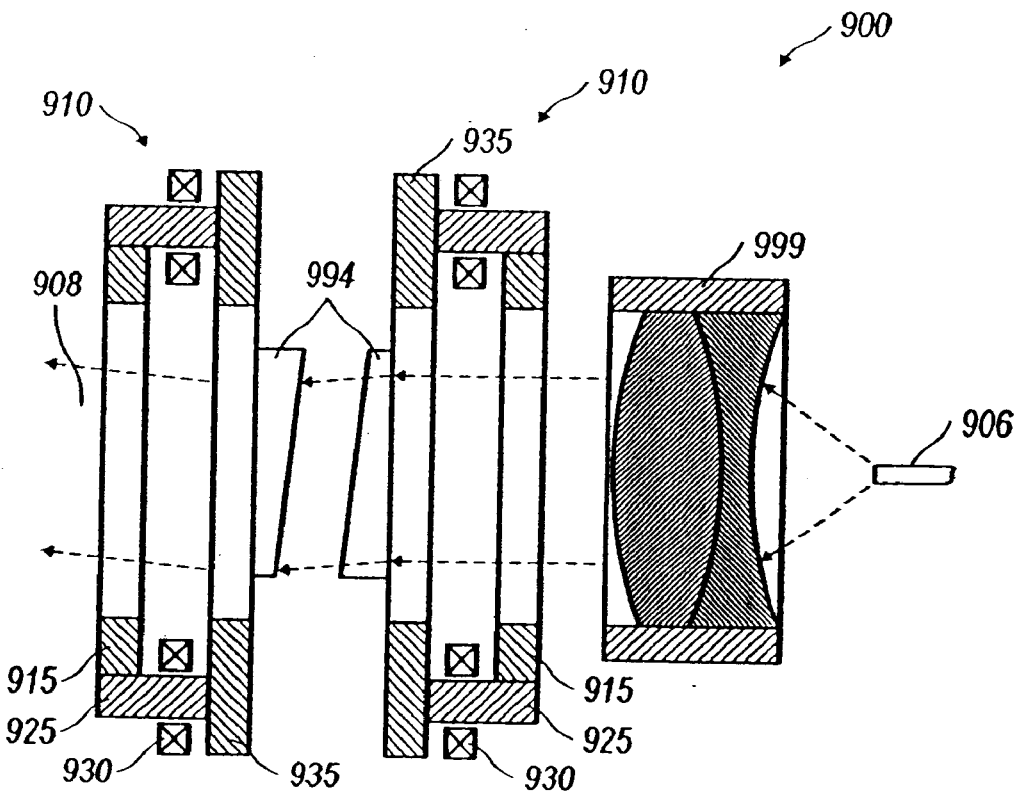
FIG. 20 illustrates a piezoelectric actuator according to an embodiment of the present invention.

FIG. 20 illustrates a dual actuator configuration 900, wherein two actuators 910 are used in combination to effectuate light direction in multiple degrees of freedom. Each of the two actuators includes a prism 994 attached to the movable shuttle 935. By rotating the prisms 994 with respect to one another the beam 908 emerging from a fiber 906/lens 999 assembly is capable of being directed in two degrees of freedom. The actuator 900, is a novel beam steering unit 4 useable in, for example, the OXC configuration of FIG. 17.

Figure 21:
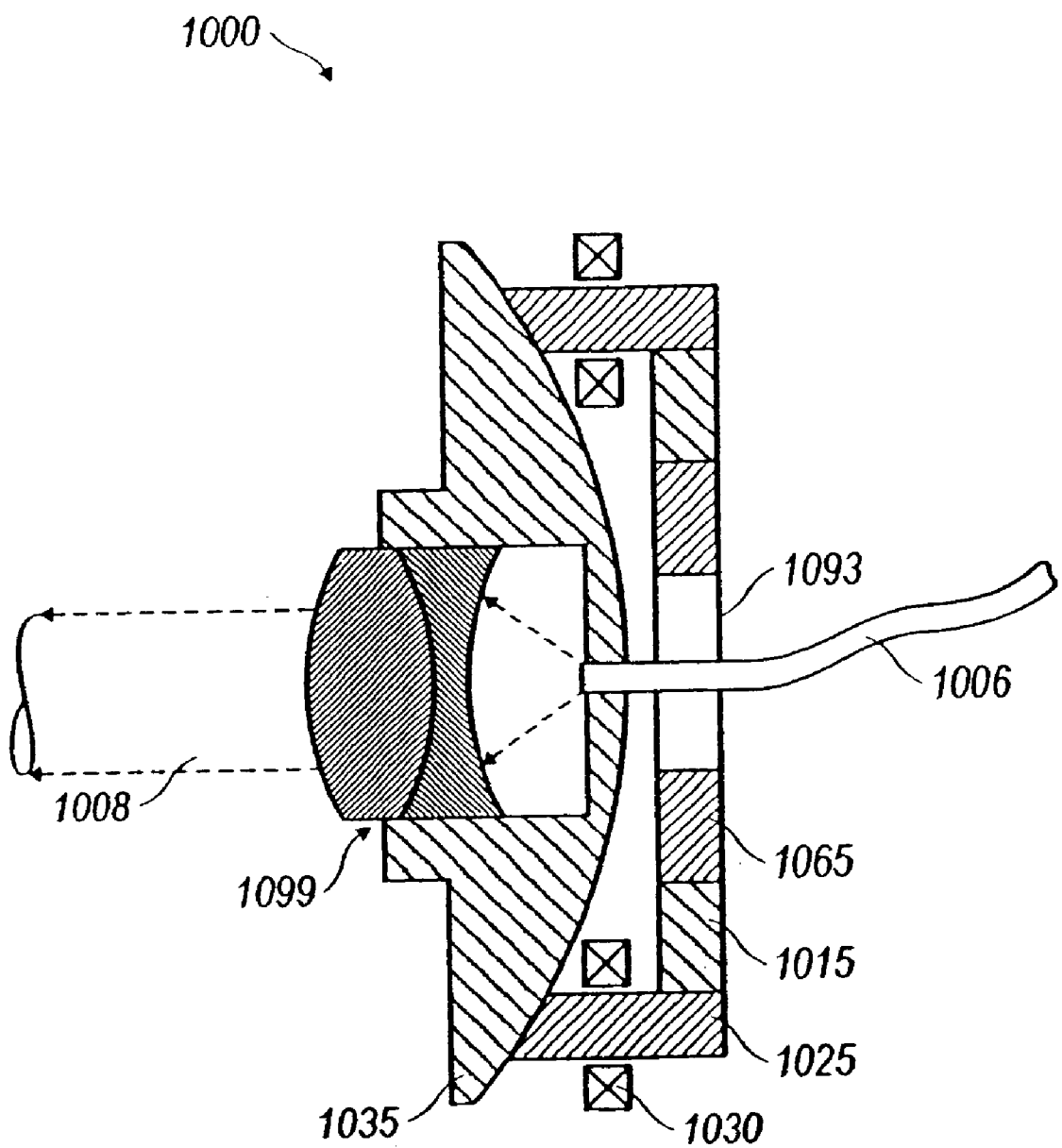
FIG. 21 illustrates a piezoelectric actuator according to an embodiment of the present invention.

According to yet another embodiment of the present invention, FIG. 21 illustrates a piezoelectric-electromagnetic actuator 1000 with a fiber 1006 and at least one lens 1099 attached to the shuttle 1035. The fiber 1006 is located at or near the focal plane of the at least one lens 1099 in order to create a beam 1008. The shuttle 1035 is made to move in two degrees of rotation, and consequently, the optical beam direction can be controlled in two degrees of freedom. The fiber 1006 freely passes through a hole 1093 in the base 1065 so as to avoid breaking when the shuttle 1035 is moved. The actuator 1000, is a novel beam steering unit 4 useable in, for example, the OXC configuration of FIG. 17.

Figure 22A:
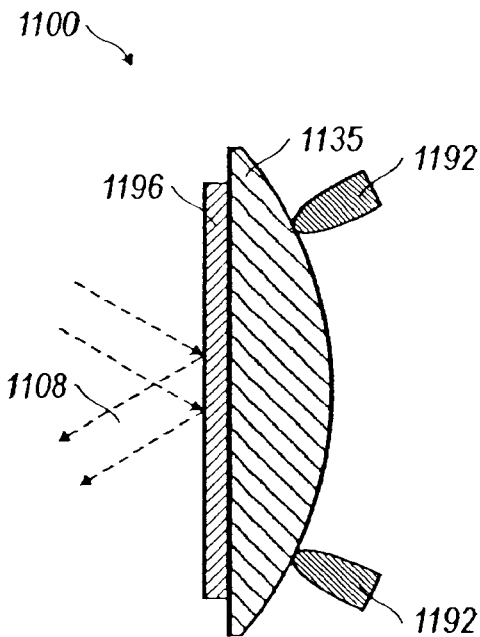
FIGS. 22A–22D illustrate piezoelectric actuators according to embodiments of the present invention.
Figure 22B:
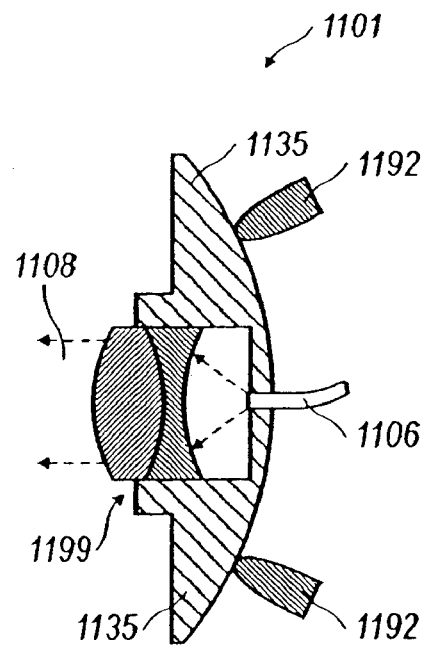
Figure 22C:
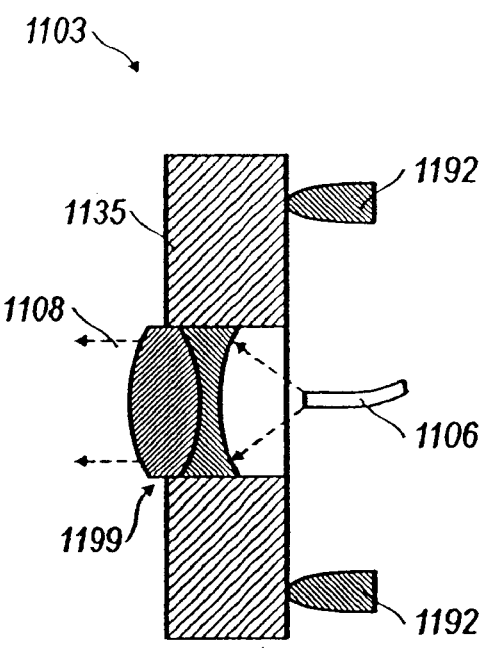
Figure 22D:
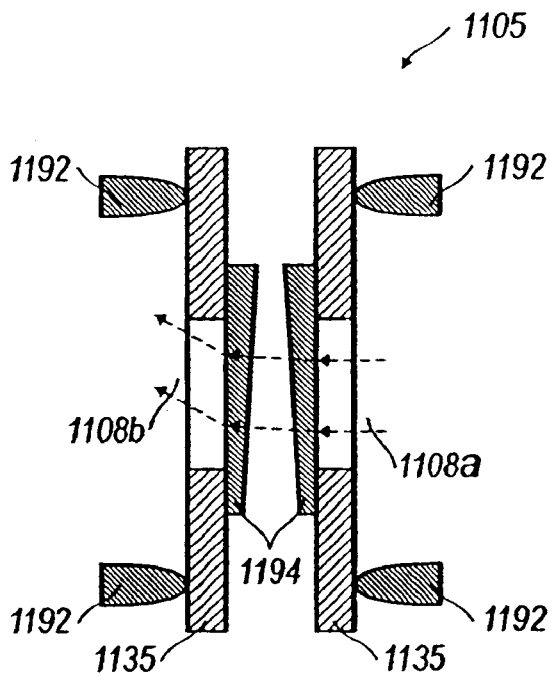

FIGS. 22A–D illustrate actuator configurations 1100, 1101, 1103, and 1105 utilizing "point vibration actuators" (PVAs) 1192 for controlling beam direction. PVAs are described further above in the "Description of the Related Art" section of this specification. Referring to FIG. 22A, actuator 1100 comprises a reflective surface 1196 controlled by two or more PVAs 1192. (Only two PVAs are illustrated). To locate the rotating part kinematically, a third point is provided for the part to rest on. This point may be a third PVA or a simple friction point or sliding point. More then three PVAs may be used as well. The shuttle 1135 is actuated in two degrees of rotation to steer the beam 1108 in two degrees of freedom. FIG. 22B illustrates an actuator 1101 having PVAs 1192 that are organized as in FIG. 22A to move a lens 1199/fiber 1106 assembly in two degrees of rotation. FIG. 22C illustrates an actuator 1103 having PVAs 1192 arranged to move a lens 1199, while the fiber 1106 remains stationary, in two linear directions of motion. This structure allows for steering the direction of the beam 1108 in two degrees of freedom. Finally, FIG. 22D illustrates an actuator 1105 having at least four PVAs 1192 and two shuttles 1135 each having a prism 1194 attached thereto. The PVAs 1192 rotate each shuttle 1135 and prism 1194 in circular motion around the axis of the incoming beam 1108a to aim the outgoing beam 1108b in two degrees of freedom. As mentioned previously, more than two PVAs 1192 (or more then four PVAs 1192 in the case of 22D) can be utilized in each configuration.

Figure 23A:
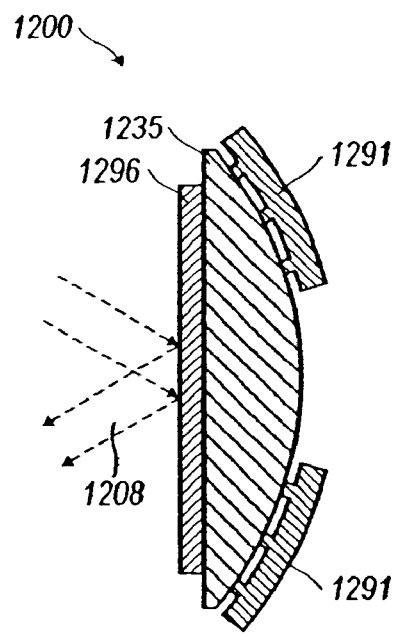
FIGS. 23A–23D illustrate piezoelectric actuators according to embodiments of the present invention.
Figure 23B:
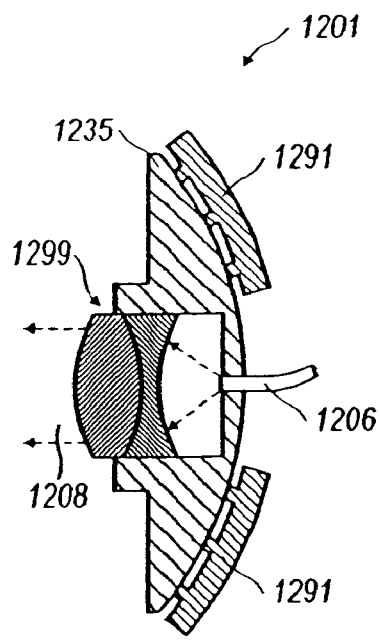
Figure 23C:
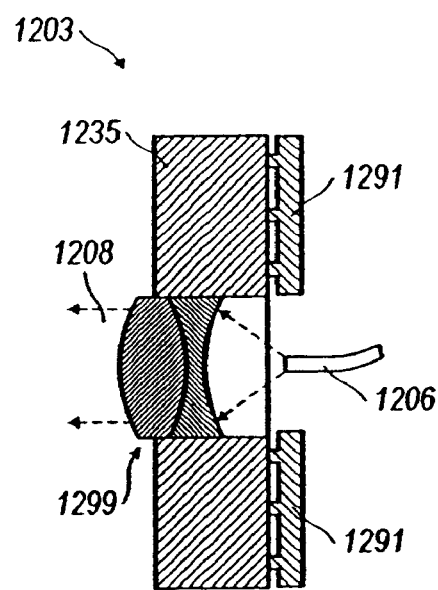
Figure 23D:
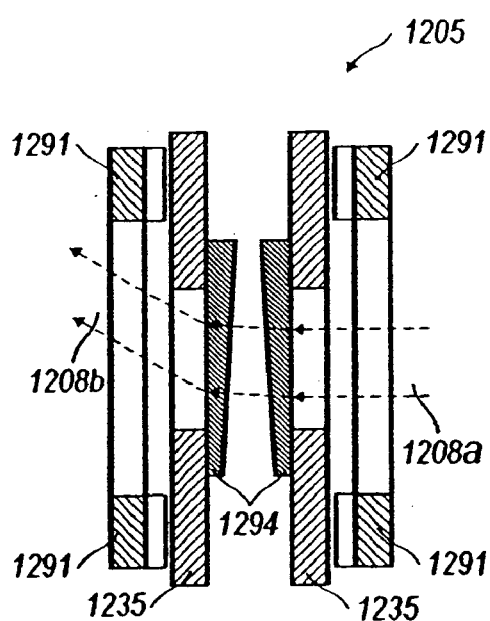

FIGS. 23A–D illustrate actuator configurations 1200, 1201, 1203 and 1205 utilizing "surface vibration actuators" (SVAs) 1291 for controlling beam direction. SVAs are described further above in the "Description of the Related Art" section of this specification. Referring to FIG. 23A, actuator 1200 comprises a reflective surface 1296 controlled by two or more SVAs 1291. The shuttle 1235 is actuated in two degrees of rotation to steer the beam 1208 in two degrees of freedom. FIG. 23B illustrates an actuator 1201 having SVAs that are organized as in FIG. 23A to move a lens 1299/fiber 1206 assembly in two degrees of rotation. FIG. 23C illustrates an actuator 1203 having SVAs 1291 arranged to move a lens 1299 in two linear directions of motion, while the fiber 1206 remains stationary. This structure allows for direction of the beam 1208 in two degrees of freedom. Finally, FIG. 23D illustrates an actuator 1205 having at least two circular SVAs 1291 and two shuttles 1235 each having a prism 1294 attached thereto. The SVAs 1291 rotate each shuttle 1235 and prism 1294 in circular motion around the axis of the incoming beam 1208a to aim the outgoing beam 1208b in two degrees of freedom. The SVAs 1291 are circular structures and the surface waves travel in a circle. As mentioned previously, more than two SVAs 1291 (or more then two circular SVAs 1291 in the case of 23D) can be utilized in each configuration.

Figure 24A:
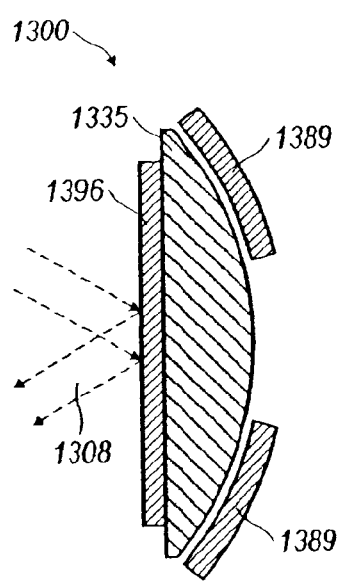
FIGS. 24A–24F illustrate piezoelectric actuators according to embodiments of the present invention.
Figure 24B:
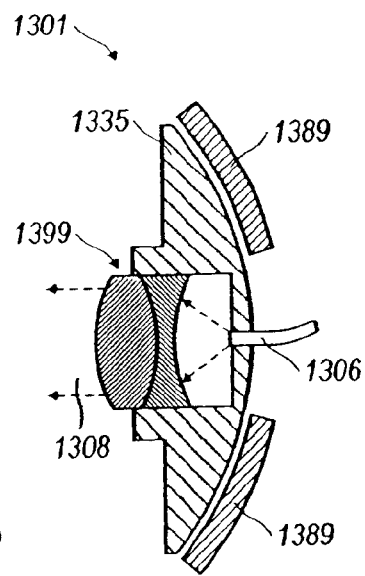
Figure 24C:
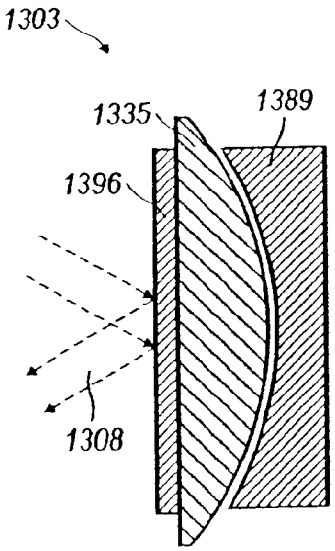
Figure 24D:
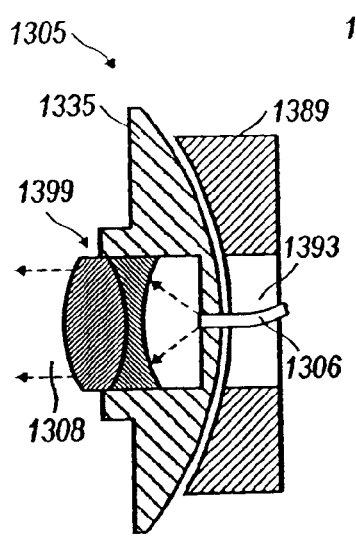
Figure 24E:
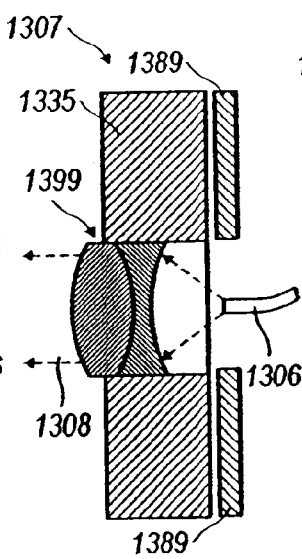
Figure 24F:
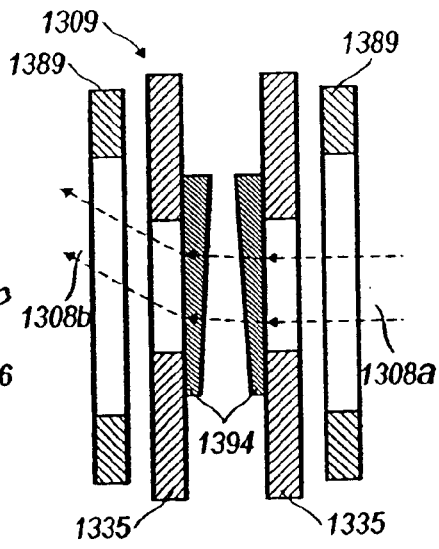

FIGS. 24A–F illustrate actuator configurations 1300, 1301, 1303, 1305, 1307, and 1309 that utilize "ultrasonic actuators" (UAs) 1389 for controlling beam direction. Referring to FIG. 24A, actuator 1300 comprises a reflective surface 1396 controlled by two or more UAs 1389. UAs are described further above in the "Description of the Related Art" section of this specification. The shuttle 1335 is actuated in two degrees of rotation to steer the beam 1308 in two degrees of freedom. FIG. 24B illustrates an actuator 1301 having UAs 1389 that are organized as in FIG. 24A to move a lens 1399/fiber 1306 assembly in two degrees of rotation. FIG. 24C illustrates an actuator 1303 having a single large UA 1389 attached to the shuttle 1335. The pattern of metalization on the piezoelectric material (not shown) is such that ultrasonic waves are created in two orthogonal directions in response to the actuation of the UA 1389. This orthogonal direction creates motion of the shuttle 1335 in the desired rotation. FIG. 24D illustrates an actuator 1305 having a single large UA 1389 attached to the shuttle 1335. The pattern of metalization on the piezoelectric material (not shown) is such that ultrasonic waves are created in two orthogonal directions in response to the actuation of the UA 1389. The UA 1389 moves the shuttle 1335 and consequently at least one lens 1399, and fiber 1306 assembly in two orthogonal directions of motion. The fiber 1306 freely passes through a hole 1393 in the UA 1389 so as to avoid breaking when the shuttle 1335 is moved. FIG. 24E illustrates an actuator 1307 having UAs 1389 arranged to move at least one lens 1399 in two linear directions of motion. The fiber 1306 is stationary and the actuator 1307 controls the direction of the emerging beam in two degrees of freedom. Although multiple UAs are shown, an alternative embodiment includes one large UA with a center hole similar to that shown in FIG. 24D. The hole allows the light to pass between the fiber and lens, and the metalization pattern (not shown) creates ultrasonic waves propagating in two directions. In a similar way, the lens 1399 may be stationary and the fiber 1306 is movable in two linear directions of motion. Finally, FIG. 24F illustrates an actuator 1309 having at least two circular UAs 1389 and two shuttles 1335 each having a prism 1394 attached thereto. The UAs 1389 rotate each shuttle 1335 and prism 1394 in circular motion around the axis of the incoming beam 1308*a* to aim the outgoing beam 1308*b* in two degrees of freedom. The UAs 1389 are circular structures and the surface waves travel in a circle. As mentioned previously, more than two UAs 1389 (or more then two circular UAs 1389 in 24F) can be utilized in each configuration.

Figures 25A, 25B:
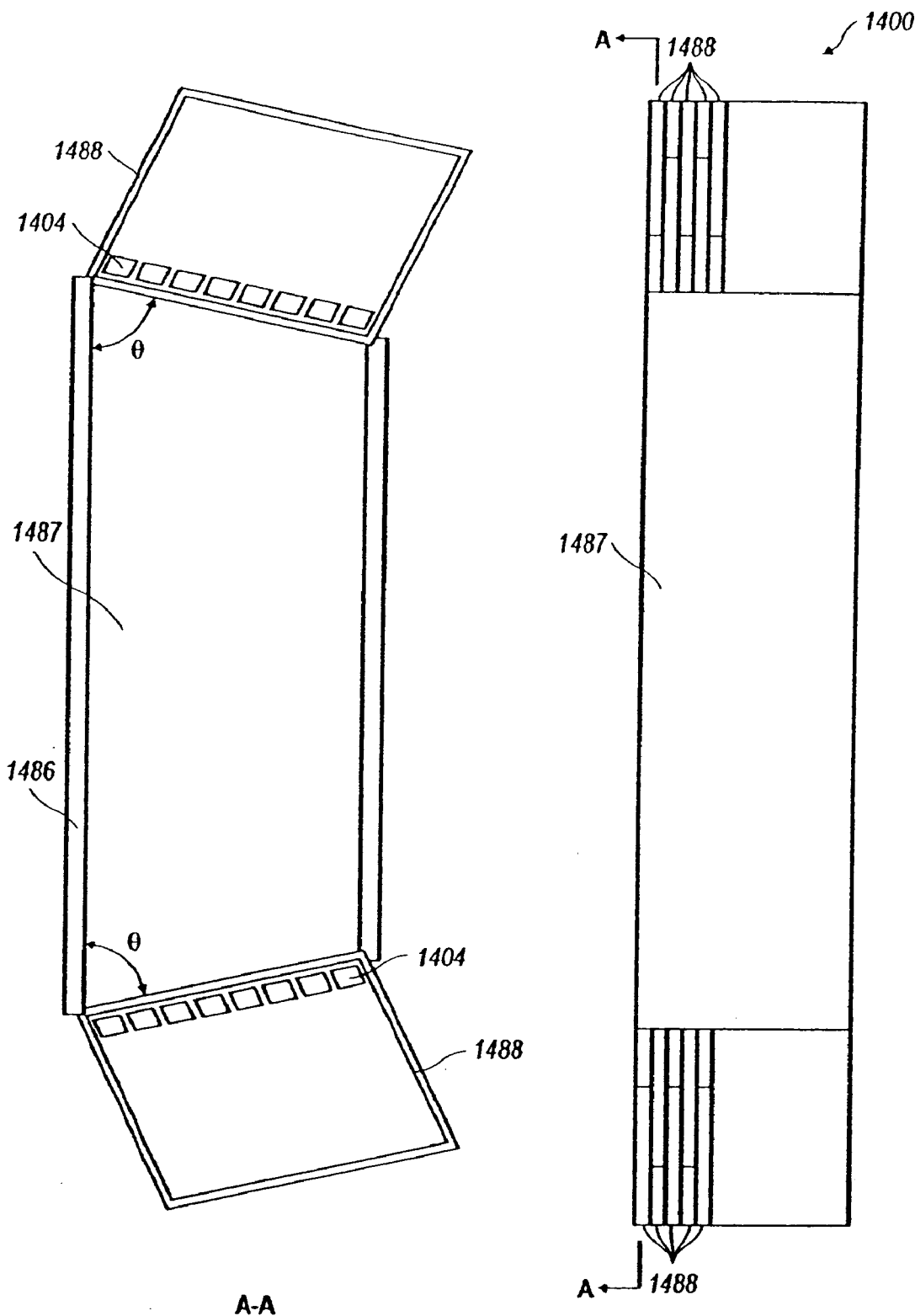
FIGS. 25A–25B illustrate an optical cross connect (OXC) chassis according to an embodiment of the present invention.
Figure 26:
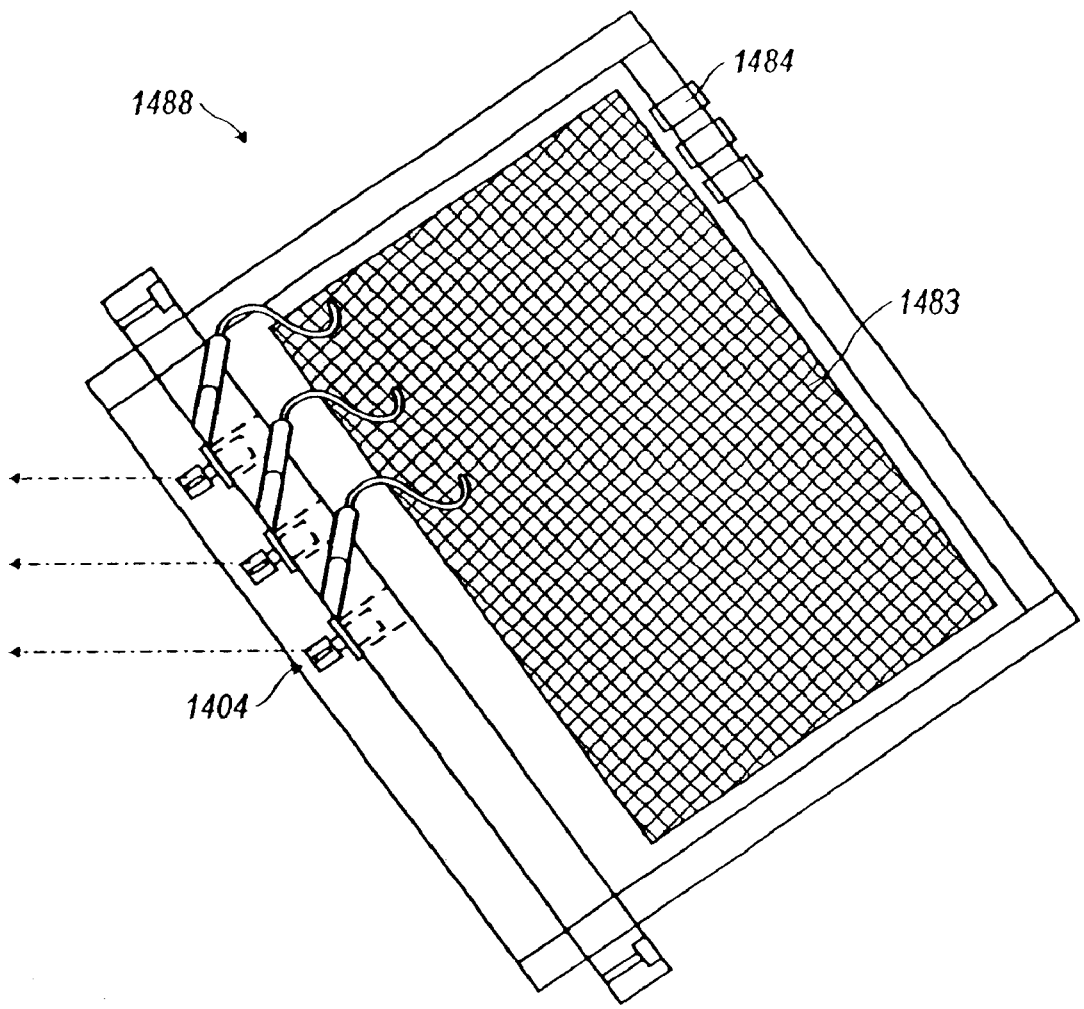
FIG. 26 illustrates a modular unit of an optical cross connect (OXC) chassis according to an embodiment of the present invention.

FIGS. 25A–B illustrate an OXC chassis 1400 according to an embodiment of the present invention. The OXC chassis 1400 includes multiple (e.g., 16) modular units 1488 on each of two sides, each modular unit further including a predetermined number, e.g., 8, of beam steering units 1404. The multiple modular units 1488 are separated by an air chamber or optical path 1487 defined by walls 1486 on four sides (only two walls are shown). Further, the modular units 1488 are placed such that there is a predetermined angle θ (e.g., 45 degrees) between each of the facing sides of the modular units and the optical path 1487. Using this angled configuration, space is conserved without the need for additional folding optics. Additional folding optics would decrease the efficiency of the optical system. This is avoided with this angled configuration. In a particular embodiment of the present invention, the size of each of the individual beam steering units is approximately 20×20×20 mm$^3$ and the size of the OXC chassis is approximately 350×350×1200 mm$^3$. In this particular embodiment, there are 16 modular units, each having 8 beam steering units. Consequently, there are 128 input/output fibers on each side of the OXC. Referring to FIG. 26, a modular unit 1488 is further illustrated, including multiple beam steering units 1404. Also shown are the optical and electronic connectors 1484 for each of the multiple beam steering units 1404 as well as an electronics board 1483 for making the physical and electronic connections between the wiring of the multiple beam steering units 1404 and the optical and electronic connectors 1484. Further to this particular embodiment, referring to FIG. 27, each beam steering unit 1404 includes a fiber to beam converter 1405, hereafter referred to as a beam generating unit for forming the beam 1408 from any input fiber 1406. The beam generating unit 1405 begins with the input fiber 1406 that passes the input beam through a block 1482 made of silica, quartz or glass having refractive index similar to that of the fiber core, within a tube 1481 and onto at least one focusing lens 1499. The block 1482 is used to avoid the light entering air directly from the fiber, and to expand the beam before it is transferred from block 1482 to air. Alternatively, the light may be made to travel from the fiber end directly to air, and the block 1482 may be omitted. The fibers 1406 are welded to the block 1482 with, for example, a CO$_2$ laser. The focusing lens 1499 is focused at 2 times the length of the optical path 1487 (See FIG. 26). For example, if the optical path 1487 is 1000 mm long, the lens 1499 is adjusted to create a real image of the fiber end at 2000 mm distance. By focusing the beam at twice the distance of the optical path, variations in path length between input and output ports are tolerable, as opposed to focusing to the average path length and as opposed to focusing at infinity, which results in considerable beam and thus signal loss. With this spacing, preferred embodiments for a single mode fiber include a 10 mm focal length lens and 3 mm beam diameter and for a multi mode fiber include a 15 mm focal length lens and a 8.4 mm beam diameter. Using this relationship, the OXC focus is not optimized for minimum optical loss, but instead is optimized to minimize variation between any pair of fibers, since the distance between any two sets of fibers varies. The OXC chassis constructed according to the embodiment described herein allows for any one of the 128 input beams to be directed to any one of the 128 output beams, forming a non-blocking cross connect. One skilled in the art recognizes that these specific examples are merely exemplary and are not intended to be limiting. Other exemplary cross connect configurations usable with the present invention are described, for example, in U.S. Pat. Nos. 6,097,860 and 6,295,154, which are incorporated herein by reference in their entireties.

Figure 28A:
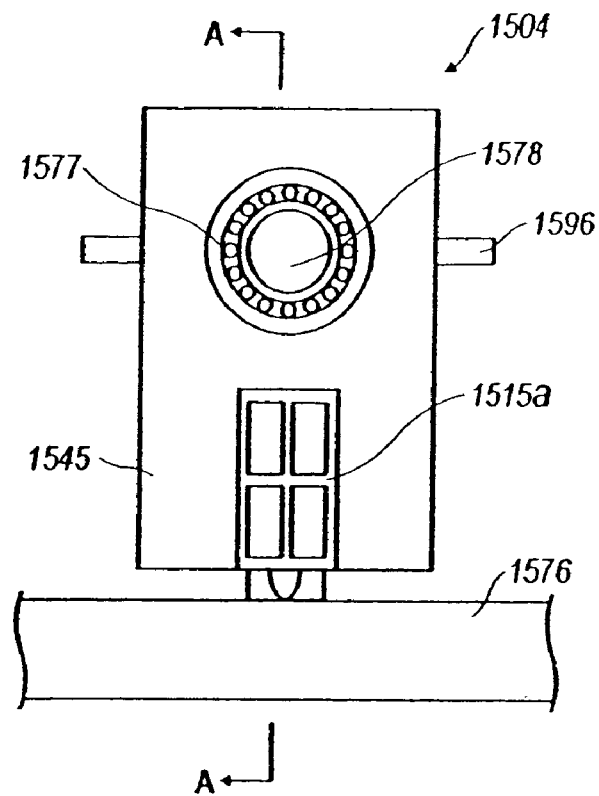
FIGS. 28A–28B illustrate a beam steering unit according to an embodiment of the present invention.
Figure 28B:
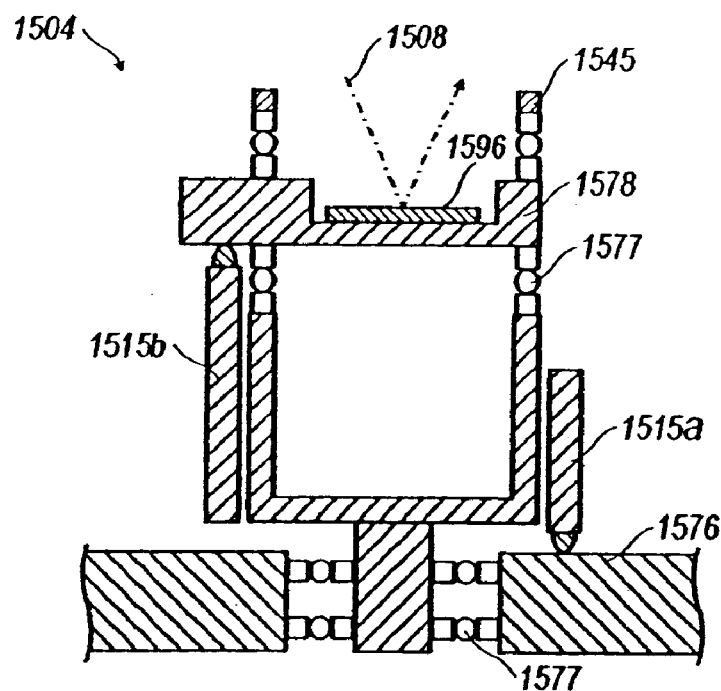

Referring to FIGS. 28A–B, a beam steering unit 1504 according to an embodiment of the present invention is illustrated. This beam steering unit 1504 is usable in the modular units 1488 and ultimately the OXC chassis 1400 described above. The beam steering units 1504 are comprised of at least two piezoelectric motors 1515*a* and 1515*b*. The piezoelectric motors 1515*a* and 1515*b* are selected from any of the previously described piezoelectric motors as well as conventional piezoelectric motors such as those developed by Nanomotion Ltd., described in U.S. Pat. No. 5,453,653 which is incorporated herein by reference in its entirety. In addition to piezoelectric motors 1515*a* and 1515*b*, the beam steering unit 1504 includes a yoke 1545 with a rotatable rod 1578 fitted there through via ball bearings 1577. Attached to the rotatable rod 1578 by a securing mechanism (e.g., glue) and located within the U-shape of the yoke 1545 is a reflective surface 1596, i.e., a mirror. The yoke 1545 is rotatably attached to a carrying beam 1576 through ball bearings 1577. In operation, piezoelectric motor 1515*a* is referred to as the azimuthal motor and operates to rotate the yoke, while piezoelectric motor 1515*b* is referred to as the elevational motor and operates to rotate the reflective surface (e.g., mirror) 1596. In a preferred embodiment of the beam steering unit 1504, at the points wherein the piezoelectric motors touch the other elements of the beam steering units 1504, there is a layer of ceramic therebetween, so as to reinforce the actuating point between the motor and the rotatable elements and minimize wear and tear on the elements. Using the movable mirror beam steering units 1504, light is switchable from an input to an output, e.g., from an input fiber to an output fiber, without the need to move the fibers. In an alternative embodiment, the dual motor beam steering unit operates to move the actual inputs and outputs, e.g., the input fibers and output fibers, and appropriate focusing lenses, so as to align and cross connect data beams. One skilled in the art recognizes the alignment issues and variables inherent to current switching technology and the applicability of the actuators, piezoelectric motors, and OXC configurations described herein.

Figure 29A:
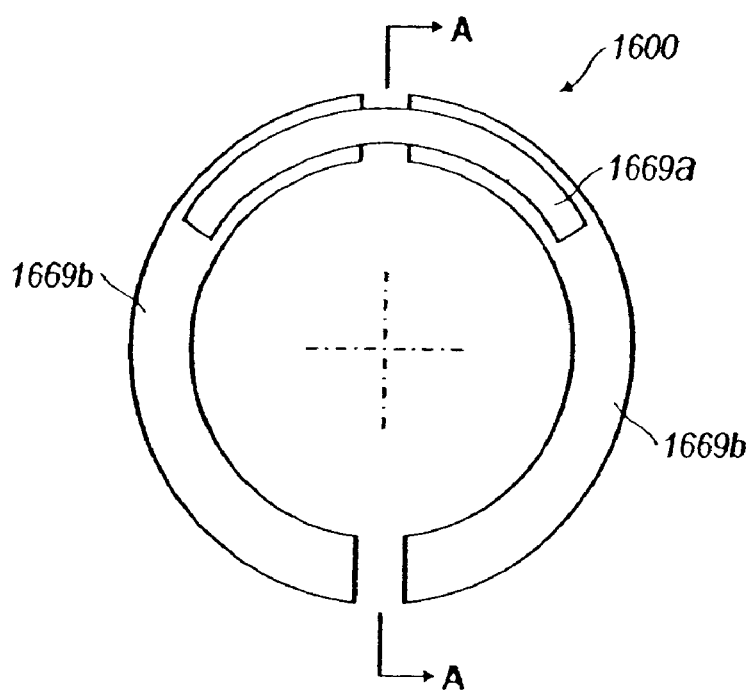
FIGS. 29A–29B illustrate an alignment system according to an embodiment of the present invention.
Figure 29B:
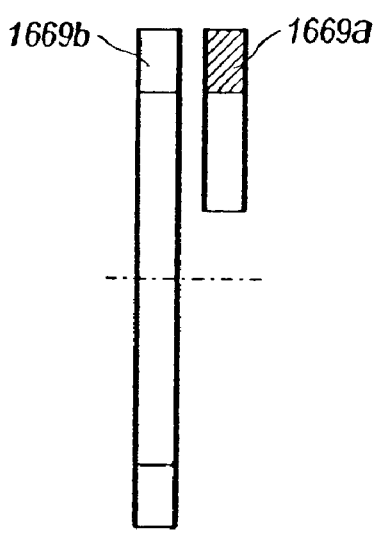

Described above are numerous piezoelectric motor and OXC configurations for switching and connecting multiple input and output data communication lines. In order to establish and maintain efficient connections between optical transmission inputs and outputs, it is helpful to utilize alignment and/or servo systems and methods. Referring to FIGS. 29A and 29B, an alignment system 1600 according to an embodiment of the present invention is illustrated. The alignment system 1600 includes plate differential capacitors 1669*a* and 1669*b*. By measuring the capacitance and any change therein as plate 1669*a* moves in relation to plates 1669*b*, it is possible to determine the azimuth and elevation using two separate alignment systems 1600 units, one for azimuth and one for elevation and thus determine the position of the reflective surface or the fiber of a beam steering unit. For example, if the plate 1669a moves in accordance with the yoke and thus the mirror, varying capacitances are generated between the moving plate 1669a and the stationary plates 1669b, indicative of the varying positions of the yoke, etc. In this embodiment, when the moving plate 1669a rotates relative to one of the stationary plates 1669b, the capacitance between 1669a and one of the stationary plates 1669b is increasing and the capacitance between 1669a and the other stationary plate 1669b is decreasing. By comparing the capacitances, it is possible to deduce the position of the 1669a.

Figure 30A:
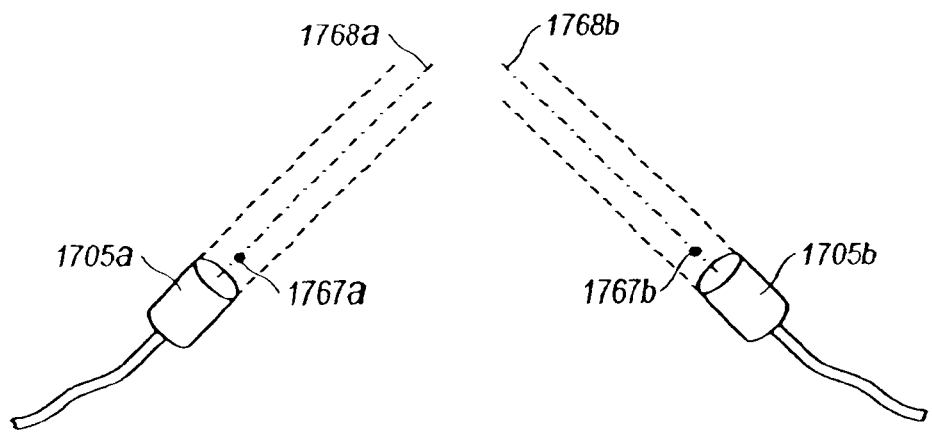
FIGS. 30A–30C illustrate dual beam alignment configurations according to embodiments of the present invention.
Figure 30B:
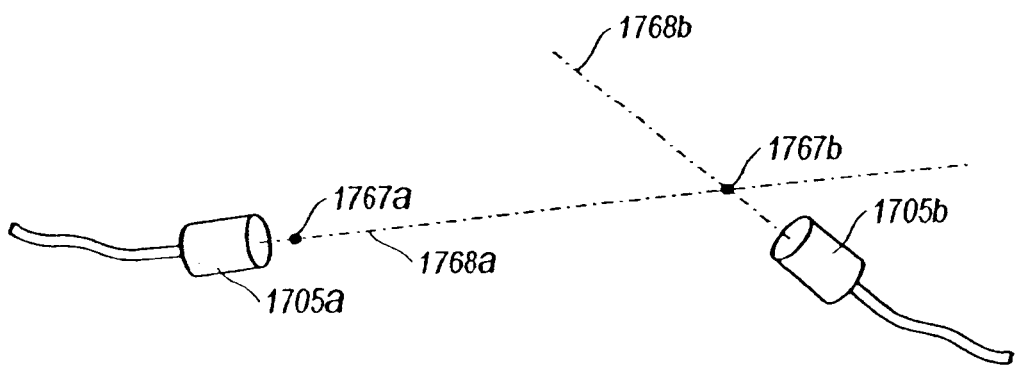
Figure 30C:
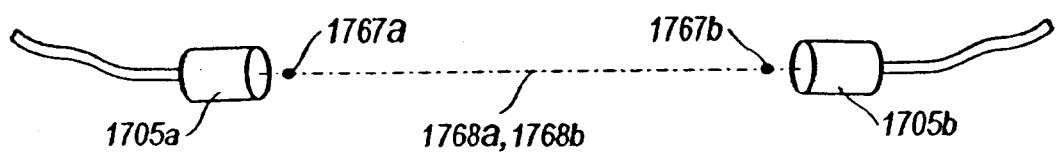
Figure 31:
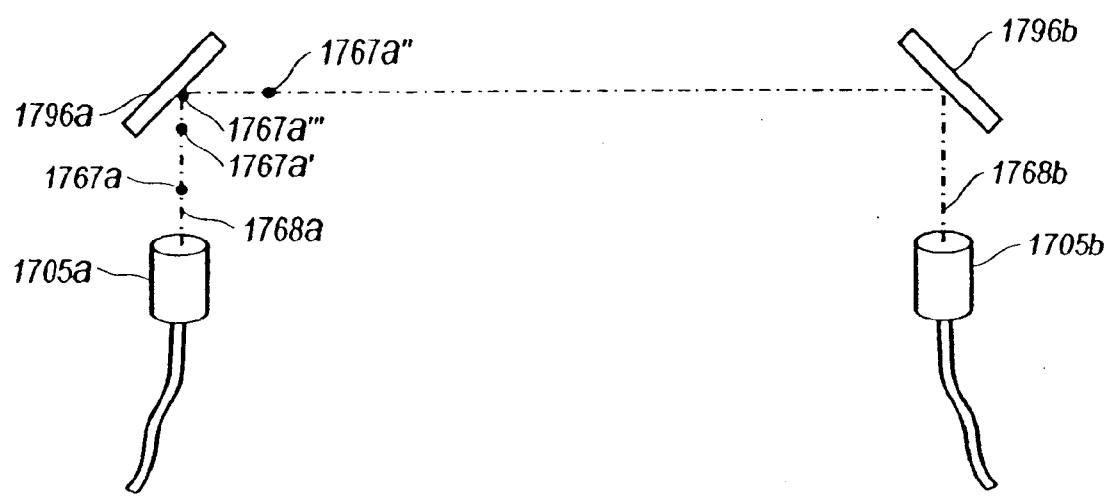
FIG. 31 illustrates a servo system according to an embodiment of the present invention.

Alternative alignment systems and methods are described below. In order to consistently and efficiently align optically transmitted data signals between input and output beam generating units, e.g., 1405 as described in FIG. 27, the center lines between the input and output beams need to coincide. The center lines must be, in effect, the same line, passing through at least the same two points. Referring to FIGS. 30A–30C, input and output beam generating units 1705a and 1705b are illustrated, along with center lines 1768a and 1768b representing the center of transmission and servo beams/signals and alignment points 1767a and 1767b. In FIG. 30A, the center lines and consequently the input and output beam generating units 1705a and 1705b are not aligned. In FIG. 30B, beam generating unit 1705a is rotated so that center line 1768a passes through alignment point 1767b. Similarly, in the next step illustrated in FIG. 30C, beam generating unit 1705b is rotated so that center line 1768b passes through alignment point 1767a. In order to facilitate the aiming of the center lines with the points, in an embodiment of the present invention, detectors are utilized to measure how much of the beam/signal containing the center line is actually passing through a point. Although FIGS. 30A–30C illustrate rotating the beam generating units 1705a and 1705b in order to achieve center line overlap, in an alternative embodiment of the present invention illustrated in FIG. 31, the beam generating units 1705a and 1705b remain stationary while rotatable reflective surfaces 1796a and 1796b are used to align the beams and consequently the center lines 1768a and 1768b between the beam generating units 1706a and 1706b. Reflective surfaces 1796a and 1796b are part of beam steering units such as those described previously in this disclosure. Further, alternative beam steering units for steering beams with moving lenses, moving fibers or rotated prisms are shown in FIGS. 19–24 and may be used to align the optical beams and consequently the center lines 1768a and 1768b. As illustrated and discussed further herein, the beam steering units described herein are usable in and with the alignment systems and methods discussed herein. FIG. 31 also illustrates exemplary alignment points 1767a, 1767a', 1767a", and 1767a'" wherein detectors may be placed in order to align the opposing center lines to pass through the same point within the detector. Similar points for measurement are located closer to the opposite fiber 1706b.

There are multiple types of detectors that can be used in order to measure beams/signals and ascertain center line location. In an embodiment of the present invention, semi-transparent silicon detectors (described further below) are placed at at least one of the alignment points 1767a–a'" and one of the alignment points 1767b–b'" (see FIGS. 30A–30C for 1767b; 1767b" and 1767b'" are not shown) wherein two beams/signals (hereafter referred to as "signals"), one from one side and the other signal from the opposing side, impinge on each of the detectors. A first servo signal is an optical signal inserted into the fiber of beam generating unit and emerges as a beam out of beam generating unit. The servo signal coincides with a data beam also transmitted from beam generating unit. The first servo signal impinges onto silicon detectors, while a receiving/output beam generating unit sends a second servo signal through the silicon detectors from the opposite direction. When each of the detectors measures the centerlines of the first and second servo signal beams and as coinciding at the same point on each of the detectors, then the two centerlines of beams are aligned and the transmission signals are likewise aligned. While the first and second servo signals remain within the detectability range of the silicon detectors, i.e., up to 1.1 microns, the silicon detectors are made to be not fully absorbent and allow part of the servo beam to continue past the detectors and remain on course. The absorbed servo signal creates current in the silicon detector and is therefore measured. Since each of the first and second servo signals needs to both be detected by and pass through a first detector so as to be detected by a second detector as well, the efficiency of the detectors is not 100%. Preferably, the detectors detect 50% of the servo signals and transmit the remaining 50% to be detected by the second detector in the optical train. Further, since the preferable transmission signal wavelengths are outside of the detection ranges for the silicon detectors, i.e., 1.3 microns and 1.55 microns, the detectors fully transmit the transmission signals. Since each of the detectors will sense two servo signals, it is important to separate the signals so the electronics can discern each servo signal separately. To this end, each servo signal is modulated at a different frequency or carry different modulation or coding.

Referring to FIGS. 32A–32D, various silicon detectors according to embodiments of the present invention are illustrated. FIG. 32A illustrates a quadrant detector, wherein the amount of servo signal 1763 passing through each of the four quadrants 1764 is detected. The differential of the two servo signals detected at each quadrant is measured, and the beam steering unit is steered until this differential is the same for both servo signals. In operation, when the ratio of the amount of a first servo signal passing through each of the quadrants of one of a first detector is equal to the ratio of the amounts of a second servo signal passing through each of the quadrants of a second detector then the transmission signal 1797 is being relayed as efficiently as possible. The amounts in each quadrant of a detector need not be equal; it is the ratios between the amounts in each quadrant of a first servo signal and the ratios between the amounts in each quadrant of a servo signal that must be near equal or equal for optimization. The first and second servo signals are injected (e.g., coupled) into the input and output fibers and can be distinguished through modulation at different frequencies, digital encoding, or a similar detectable marker so that the detectors are able to discriminate between the two servo signals coming from the two sides.

Figure 36:
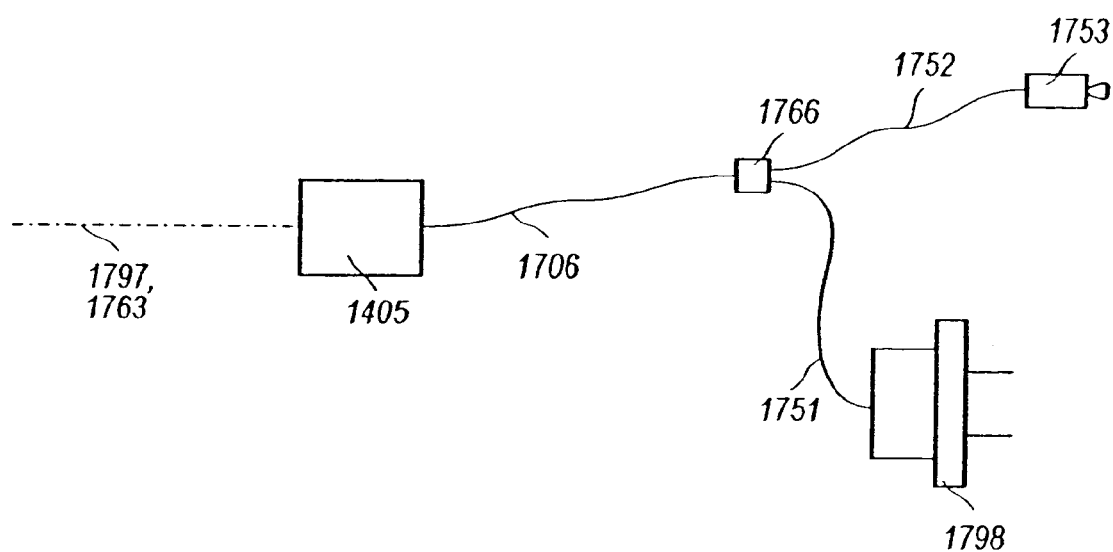
FIG. 36 illustrates a signal coupling system according to an embodiment of the present invention.

For example, as shown in FIG. 36, the transmission signal 1797 enters a fiber 1752 via a fiber connector 1753 which is coupled to the fiber 1752. The servo signal 1763 is transmitted from a standard laser source 1798 such as a CD laser or a light emitting diode (LED) or the like into fiber 1751. Fiber 1752 carrying the transmission signal 1797 and a fiber 1751 carrying the servo signal 1763 are combined using a fiber coupler 1766 with a low coupling percentage (e.g., 1–10% loss) so as to couple only a small percentage of the servo signal 1763 and a high percentage of transmission signal 1797 into the fiber 1706, which leads to a beam forming unit 1405. In an embodiment of the present invention, the fiber coupler 1766 is dichroic, such that the short wavelength servo signal 1763 from source 1798 and the transmission signal 1797 couple into fiber 1706 without loss. The combination transmission and servo signal 1797, 1763 passes through a beam forming unit, such as 1405 discussed with regard to FIG. 27, prior to impinging upon a beam steering unit. (see, for example, 1704 in FIG. 34).

Similarly, the position detector illustrated in FIG. 32B contains electrodes 1762 on four sides. When each of the first and second servo signal 1763 pass through the central portion of the position detector, electrons are collected by each of the four electrodes 1762 and by comparing the amount of current from each electrode, signal location can be determined and appropriately adjusted in order to coincide the two beams.

Yet another detector illustrated in FIG. 32C, includes four small detectors 1761 equidistant from the center line, each of which intercepts a small amount of the servo signals 1763 at the edges of the signal. As with the detectors in FIGS. 32A and 32B, the amounts detected by the four small detectors 1761 are compared and if the center of the two servo signals do not coincide, some elements within the optical train, either one or both of the movable reflective surfaces 1796a, 1796b (see FIGS. 31, 33), or one or both of the optical beam generating units 1705a, 1705b (see FIGS. 31, 33) are rotated in order to equalize the ratio of signal amounts being detected in each of the four small detectors 1761 between the two beams. With the detector in FIG. 32C, there is also some amount of the transmission signal that is intercepted by the detectors, but the amount is small and does not result in the loss of data.

Still another detector is illustrated in FIG. 32D, wherein a silicon detector 1759 is placed behind the partially reflective surface 1766. The partially reflective surface is made to be fully reflective at the transmission signal and half reflective and half transmissive at the servo signal. The silicon detector 1759 with the reflective surface 1766 together form a reflective surface/detector 1758. The silicon detector may be a thin-film silicon layer deposited on the exit side of the partially reflective surface 1766. As illustrated in FIG. 32D, the silicon detector 1759 portion of the reflective/surface detector 1758 is the detector shown in FIG. 32B, but this is merely exemplary. Other detector configurations are also possible, such as FIG. 32A. In an alternative embodiment of the present invention, the reflector/detector 1758 in FIG. 32D can be used for both beam steering by acting as the rotatable mirror 1796 of FIG. 31 and for servo signal detecting.

An alignment configuration is illustrated in FIG. 33, including the detector described with reference to FIG. 32D. Referring to FIG. 33, two thin-film versions of the reflective surface/detector 1758 of FIG. 32D are placed in the optical train, shown as 1758a and 1758b, in addition to fully reflective elements 1796a and 1796b. In operation, the partially reflective surfaces 1766 (see FIG. 32D) of reflective surface/detectors 1758a, 1758b, reflect the transmission data signal 1797 (see FIG. 36), as well as a portion of the servo signal 1763 (see FIG. 36) and transmit the unreflected portion of the servo signal that impinges on the silicon detector 1759 (see FIG. 32D) of reflective surface/detectors 1758a, 1758b. For example, a first partially reflected portion of a servo signal, reflected from the partially reflective surface 1766 of a first reflective surface/detector 1758a, travels through the optical train to a second reflective surface/detector 1758b, respectively, and some portion thereof is transmitted to the detector 1759 of reflective surface/detector 1758b for measurement thereby. This same operation also occurs in the reverse order, so that multiple servo signals are detected by multiple detectors at multiple alignment points. This configuration allows for the fully reflective elements 1796a and 1796b to move freely for alignment purposes, without concern for powering the detector and for the hardware for supplying this power, thus causing obstruction.

In the description above, reference was made to a silicon detector. Silicon detectors are useful when transmission signals are at the common wavelengths for single mode fibers, i.e. 1300 and 1550 nanometers. In such cases, the servo signal is less than 1000 nm, and the silicon detector is capable of detecting signals up to 1100 nm, while transmitting longer wavelengths. However, in multi mode fibers, transmission signals are common at 820 or 850 nm as well. The transmission signals may interfere with the operation of the detector. In such case, the servo signal is constructed so as to be less than 700 nm, i.e., through the use of standard compact disc player lasers that emit at around 600 nm. In the case of multi-mode fibers, for example, the detectors 32A–C are constructed of, for example, GaAsP, such as the of GaAsP photodiode manufactured by Hamamatsu, which detects at 600 nm but not at 820 nm. Further, in the design of detector 32D, another option to accommodate transmission signals at 820–850 nm is to use a silicon detector, and make the reflective surface partially transmitting below 800 nm and fully reflect above 800 nm. If the reflective surface of detector 32D leaks a small amount of the transmission signal at 820–850 nm, the detector is immune to this small signal by coding or modulating the servo signals in such a way that the detected signals can be separated to the detected servo signals and the detected transmission signal.

Figure 34:
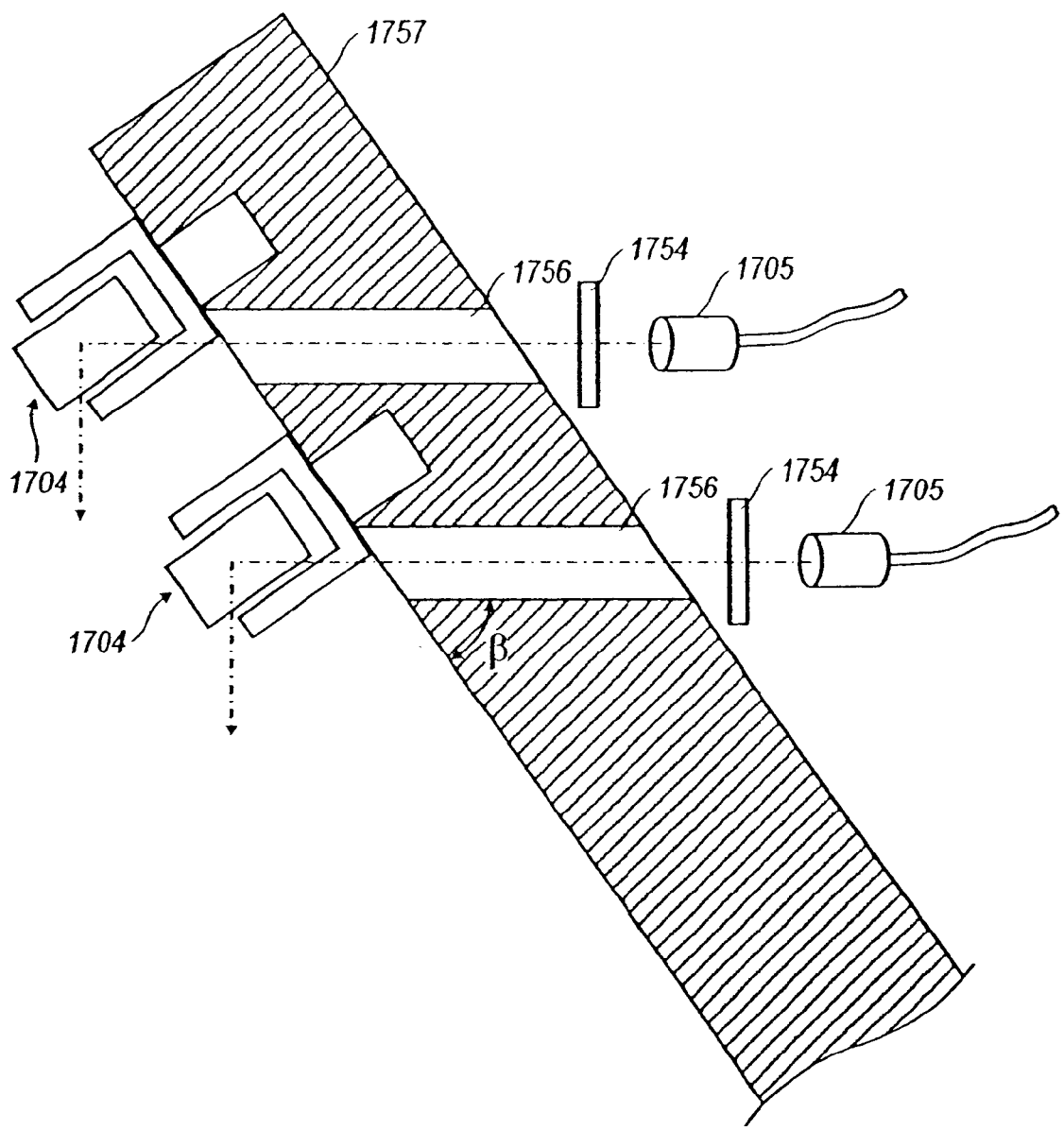
FIG. 34 illustrates a combination beam generating unit and beam steering unit configuration according to an embodiment of the present invention.
Figure 35:
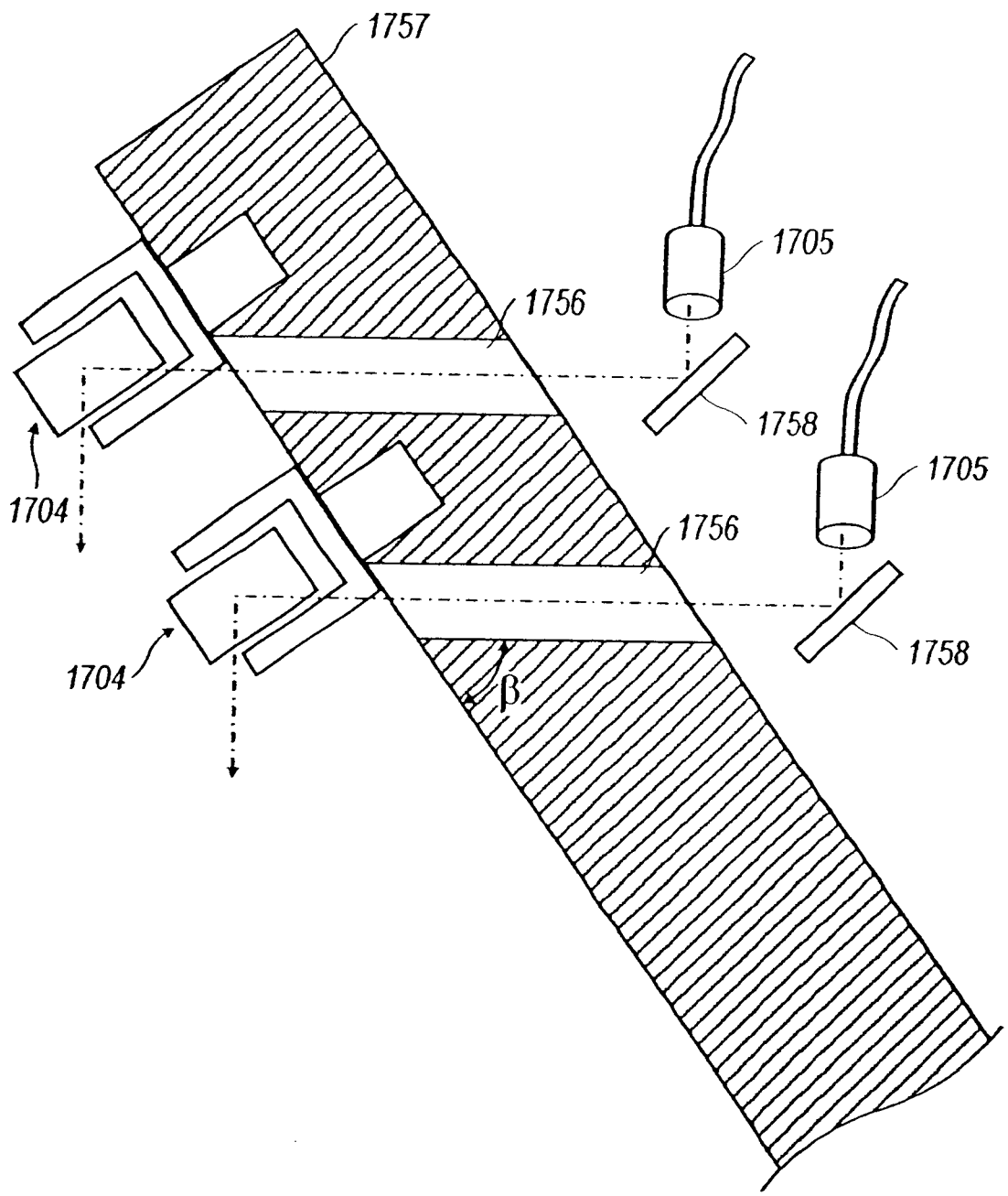
FIG. 35 illustrates a combination beam generating unit and beam steering unit configuration according to an embodiment of the present invention.

Referring back to the modular units 1488 of an OXC 1400 according to an embodiment of the present invention (see FIGS. 25A–27), the alignment configurations described above are incorporated therein as illustrated in FIGS. 34 and 35. As illustrated in FIGS. 26, 34 and 35, servo and transmission signals impinge upon the beam steering units 1704 from approximately 45 degrees, through holes 1756 drilled at approximately a 45 degree angle β to the edge of a carrier beam 1757. In FIG. 34, the detector 1754 (see FIGS. 32A–32C) is placed at any point between the beam steering unit 1704 and the beam generating unit 1705 in the optical train, including inside the carrier beam 1757. In FIG. 35, the alignment configuration discussed with reference to FIG. 33 is incorporated into a modular unit 1488. A thin-film version of the reflective surface/detector 1758 of FIG. 32D is placed in the optical train, between the beam steering unit 1704 and the beam generating unit 1705 and at a predetermined angle thereto. Although only two beam steering units with respective alignment elements are illustrated in FIGS. 34 and 35, one skilled in the art appreciates that any number of beam steering units may comprise the modular units.

The embodiments described herein are exemplary of the inventive concept set forth, said examples including the best mode of practicing the inventive concept. This disclosure is in no way intended to be limiting. One skilled in the art recognizes the various other embodiments that fall within the scope of the invention and though not explicitly recited herein, are in fact covered by this disclosure.

I claim:

1. An optical cross connect comprising:
    a first and a second unit, wherein each of the first and second units includes at least one beam steering unit and at least one beam generating unit; and
    at least one input fiber for supplying a transmission signal to the at least one beam generating unit of the first unit and at least one output fiber for receiving the transmission signal from the at least one beam generating unit of the second unit;

wherein each of the at least one beam steering units includes at least two piezoelectric elements and at least one movable optical element for steering the transmission signal in two degrees of freedom.

2. The optical cross connect of claim 1, wherein the first and second units are separated by an optical path and are placed at an angle with respect to the optical path.

3. The optical cross connect of claim 2, wherein the angle is 45 degrees.

4. The optical cross connect of claim 1, further comprising:

a servo system for maintaining alignment of the first signal between the at least one input fiber and the at least one output fiber.

5. The optical cross connect of claim 1, wherein the at least one movable optical element includes a reflective surface.

6. The optical cross connect of claim 1, wherein the at least one movable optical element includes a lens.

7. The optical cross connect of claim 1, wherein the at least one movable optical element includes a fiber.

8. The optical cross connect of claim 1, wherein the at least one movable optical element includes a prism.

9. The optical cross connect of claim 4, wherein the servo system includes plate differential capacitors for determining the position of the at least one movable optical element.

10. The optical cross connect of claim 4, wherein the servo system includes a predetermined number of detectors within each of the first and second units, each of the predetermined number of detectors being capable of detecting each of a first and a second servo signal.

11. The optical cross connect of claim 10, wherein the first and the second servo signal are injected into input and output fibers of the optical cross connect and travel through the optical cross connect on at least part of the same path as the transmission signal.

12. The optical cross connect of claim 1, wherein the at least two piezoelectric elements are point vibrating piezoelectric actuators.

13. The optical cross connect of claim 1, wherein the at least two piezoelectric elements are surface vibrating piezoelectric actuators.

14. The optical cross connect of claim 1, wherein the at least two piezoelectric elements are ultrasonic piezoelectric actuators.

15. The optical cross connect of claim 11, wherein the predetermined number of detectors within each of the first and second units is the same; and further wherein the predetermined numbers of detectors are comprised of silicon.

16. The optical cross connect of claim 15, wherein each of the predetermined number of detectors is capable of transmitting approximately all of the transmission signal and transmits part of each of the first and second servo signals, such that the non-transmitted part of each of the first and second servo signals is detected by the detector.

17. The optical cross connect of claim 15, wherein the predetermined number of detectors further comprise a partially reflective surface, wherein the partially reflective surface reflects all of the transmission signal and part of each of the first and second servo signals, such that the unreflected part of each of the first and second servo signals is transmitted through the partially reflective surface and is detected via the silicon.

18. An optical cross connect comprising:

a first and a second unit, wherein each of the first and second units includes at least one beam steering unit and at least one beam generating unit; and at least one input fiber for supplying a transmission signal to the at least one beam generating unit of the first unit and at least one output fiber for receiving the transmission signal from the at least one beam generating unit of the second unit;

wherein the first and second units are separated by an optical path, and further wherein the at least one beam generating unit of the first unit and the at least one beam generating unit of the second unit each include a focusing mechanism for focusing the beam at twice the length of the optical path.

19. A system for determining optimal beam location between a first optical port and a second optical port comprising:

a first and a second alignment signal, wherein the first alignment signal originates from the first optical port and the second alignment signal originates from the second optical port; and a first and a second detector;

wherein each of the first and second alignment signals are detected by each of the first and second detectors in order to determine the alignment of each of the first and second alignment signals with respect to an optical path between the first optical port and the second optical port; and further wherein, when the alignment of the first and second signals within each of the first and second detectors is the same, the optimal beam location is determined.

20. The system of claim 19, wherein the first and the second detectors are located within the optical path between the first optical port and the second optical port.

21. The system of claim 20, wherein the first and the second detectors are comprised of silicon.

22. The system of claim 21, wherein wavelengths of the first and second alignment signals are different that the wavelength of the beam.

23. The system of claim 22, wherein the beam is not detected by either of the first and second detectors and is transmitted therethrough uninterrupted.

24. The system of claim 22, wherein the first and the second alignment signals are each partially transmitted and partially detected by each of the first and the second detectors.

25. The system of claim 19, further comprising a first and a second adjustment means for adjusting the alignment of the beam.

26. The system of claim 25, wherein the first adjustment means is comprised of the first detector and a first reflective surface and the second adjustment means is comprised of the second detector and a second reflective surface.

27. A method for determining optimal beam location between a first optical port and a second optical port comprising:

transmitting a first alignment signal from the first optical port towards the second optical port;

transmitting a second alignment signal from the second optical port towards the first optical port;

detecting a first part of the first alignment signal at a first detector and determining a first alignment;

transmitting a second part of the first alignment signal towards the second detector;

detecting the second part of the first alignment signal at a second detector and determining a second alignment;

detecting a first part of the second alignment signal at the second detector and determining a third alignment;

transmitting a second part of the second alignment signal towards the first detector;

detecting the second part of the second alignment signal at the first detector and determining a fourth alignment; and comparing the first, second, third, and fourth alignments, wherein when the first and fourth alignments are equivalent and the second and third alignments are equivalent, the optimal beam location is determined.

* * * * *